United States Patent
Wozny

(10) Patent No.: US 6,691,103 B1
(45) Date of Patent: Feb. 10, 2004

(54) METHOD FOR SEARCHING A DATABASE, SEARCH ENGINE SYSTEM FOR SEARCHING A DATABASE, AND METHOD OF PROVIDING A KEY TABLE FOR USE BY A SEARCH ENGINE FOR A DATABASE

(76) Inventor: Keith A. Wozny, 26 Hackett Ct., Poolesville, MD (US) 20837

( * ) Notice: Subject to any disclaimer, the term of this patent is extended or adjusted under 35 U.S.C. 154(b) by 0 days.

(21) Appl. No.: 10/114,423

(22) Filed: Apr. 2, 2002

(51) Int. Cl.[7] ............................................. G06F 17/30
(52) U.S. Cl. ....................................................... 707/2
(58) Field of Search ............................................ 707/2

(56) References Cited

U.S. PATENT DOCUMENTS

| | | | |
|---|---|---|---|
| 4,853,882 A | | 8/1989 | Marshall |
| 5,218,536 A | | 6/1993 | McWherter |
| 5,333,317 A | | 7/1994 | Dann |
| 5,608,904 A | * | 3/1997 | Chaudhuri et al. ............ 707/2 |
| 5,717,915 A | | 2/1998 | Stolfo et al. |
| 5,724,597 A | | 3/1998 | Cuthbertson et al. |
| 5,745,898 A | * | 4/1998 | Burrows ..................... 707/101 |
| 5,970,490 A | * | 10/1999 | Morgenstern ................ 707/10 |
| 5,978,795 A | * | 11/1999 | Poutanen et al. .............. 707/3 |
| 6,032,164 A | | 2/2000 | Tsai |
| 6,240,418 B1 | * | 5/2001 | Shadmon ................... 707/100 |
| 6,256,630 B1 | | 7/2001 | Gilai et al. |
| 6,338,053 B2 | * | 1/2002 | Uehara et al. ................. 707/1 |
| 6,516,312 B1 | * | 2/2003 | Kraft et al. .................... 707/3 |
| 6,529,892 B1 | * | 3/2003 | Lambert ..................... 706/55 |
| 2002/0083079 A1 | * | 6/2002 | Meier et al. .............. 707/104.1 |
| 2002/0092019 A1 | * | 7/2002 | Marcus ......................... 725/37 |
| 2002/0165707 A1 | * | 11/2002 | Call ............................... 704/2 |
| 2002/0169763 A1 | * | 11/2002 | Tada et al. ..................... 707/3 |
| 2002/0169765 A1 | * | 11/2002 | Saltz ............................. 707/3 |
| 2002/0198875 A1 | * | 12/2002 | Masters ......................... 707/4 |

OTHER PUBLICATIONS

Lee et al, Partitioned Signature Files: Design Issues and Performance Evaluation, ACM Transactions on Office Information systems, vol. 7, No. 2, Apr. 1989, pp. 158–180.*
Terence Chea, "Security Demands May Boost Area Firms", www.washtech.com/news.software/12587–1.html, Sep. 19, 2001, 3 pp.
www.onomastix.com, "ONOMASTIX the technology of names", Mar. 22, 2002, 4 pp.

* cited by examiner

*Primary Examiner*—Wayne Amsbury
(74) *Attorney, Agent, or Firm*—Kirk D. Houser; Eckert Seamans Cherin & Mellott, LLC

(57) ABSTRACT

A method for searching a database includes receiving a search criteria including a plurality of search elements corresponding to at least some of the record elements of a database. Each of the search elements is capable of returning one or more corresponding search results from the records of the database. The search elements of the search criteria are ordered based upon an expected size of the corresponding search results from the database. The database is searched with one of the search elements, which is expected to provide a first group of the search results, before searching the database with another one of the search elements, which is expected to provide a second, relatively larger sized group of the search results, thereby improving the efficiency of the database search.

89 Claims, 14 Drawing Sheets

FIG. 5

METHOD FOR SEARCHING A DATABASE, SEARCH ENGINE SYSTEM FOR SEARCHING A DATABASE, AND METHOD OF PROVIDING A KEY TABLE FOR USE BY A SEARCH ENGINE FOR A DATABASE

BACKGROUND OF THE INVENTION

1. Field of the Invention

This invention relates to methods for searching a database and, more particularly, to methods for matching textual strings and searching a relational database, such as a name/address database. The invention also relates to a search engine system for searching a database. The invention further relates to a method of providing a key table for use by a database search engine.

2. Background Information

Many software applications make use of a database containing information about individuals. This information usually includes the person's name, address, employer, and other information. Examples of such databases include marketing databases, databases of current customers, such as those maintained by a video rental store or a long distance telephone service provider, and law enforcement databases. These applications almost always provide a mechanism for accessing the information stored about a particular person based on one or more key attributes of that person. For example, a clerk at a video store will most likely be able to access an individual's account information based only on the person's telephone number or social security number. If such key information is available, then obtaining the desired database record is straightforward and current database technology permits highly efficient retrieval.

Software applications have arisen, however, in which correct, unambiguous information about the database entry being sought is not available. For example, law enforcement maintains vast databases of incidents, cases, and individuals. The information available to law enforcement and entered into these databases is very often less than absolute. For example, a database may contain information about an individual known only as John Smith of Elm Street. A user of the database may be interested in finding any entry involving Jonathan E. Smyth of 304 Elm Circle. Under straightforward database query techniques, a linkage between the two entities will not be observed because there is no exact match. Therefore, techniques have been produced to query the database for sets of records that are in some way similar to the search target. These sets are usually presented to a human user who makes the determination as to whether one of the records in the set is indeed the record being sought.

Many techniques exist to query a database, list, directory or index for a set of records that are similar to, or close to, a query target under some distance metric. For example, there is the case of constructing a set of records that differ from the query target only by the transformation of a Character Transposition. Character Transposition is a transformation in which the order of two consecutive characters is reversed. If two entries can be made to match with one application of the Character Transposition, then they could be said to be a distance of one apart. Similarly, if two entries can be made to match with two Character Transpositions, then they are said to be a distance of two apart. Hence, "Reid" and "Ried" are a distance of one apart, and "Farmer" and "Framre" are a distance of two apart.

Generally, an algorithm of this type will allow the use of a number of different transformations and compute a distance metric based on the type of transformations required, the number of transformations required, and sometimes the order in which the transformations are required, in order to compute an overall distance between a specific entry and the query target. Transformations include those generally directed at correction of typographic errors, such as Character Transposition, Character Insertion, Character Deletion, and Character Substitution. Common Transformations also include those directed at phonetic issues such as the Soundex method (e.g., a "sounds-like" search, in which a search string is tested against database records for similarity in sound), applications of Kenyon and Knott phonetic transformations, and unigram, bigram, trigram, and multigram approaches. Still other transformations exist which are directed at particular types of errors or deception attempts.

While these distance-based approaches have demonstrated good results for specific types of noise, or combinations of noise, they are usually computationally intensive over the types of variations seen in many name search applications. The computational complexity limits the usefulness of many of these approaches for real-time applications by making the algorithm unsuitably slow. Further, few, if any, of the known distance-metric search techniques preserve the substantial power inherent in Structured Query Language (SQL) over an indexed, relational database.

It is, therefore, reasonable to search for new techniques that preserve the quality of matches obtained by computationally intensive distance metric calculations while leveraging the power of SQL over an indexed database.

There is, therefore, room for improvement in database searching techniques and systems.

SUMMARY OF THE INVENTION

These needs and others are met by the present invention, which achieves high efficiency in constructing a set of database entries that potentially match a search target. In particular, the invention may be employed to provide matching against a name/address database.

As one aspect of the invention, a method for searching a database including a plurality of records, with at least some of the records having a plurality of record fields and a plurality of record elements, comprises: receiving a search criteria including a plurality of search elements corresponding to at least some of the record elements of the database, each of the search elements being capable of returning one or more corresponding search results from the records of the database; ordering the search elements of the search criteria based upon an expected size of the corresponding search results from the database; and searching the database with one of the search elements, which is expected to provide a first group of the search results, before searching the database with another one of the search elements, which is expected to provide a second group of the search results, the second group being larger in size than the first group.

The method may further comprise constructing a search priority array including a plurality of records, with each of the records of the search priority array having a plurality of fields; employing a search priority field as one of the fields of the records of the search priority array; and calculating the search priority field for each of the records of the search priority array. The method may further comprise employing an array of replacement words including a plurality of records; employing with each of the records of the array of replacement words an original word, a replacement word and a priority constant; and for at least some of the search elements of the search criteria, determining if one of the at least some of the search elements corresponds to one of the replacement words of the array of replacement words and responsively employing a corresponding one of the priority constants of the array of replacement words in the step of ordering the search elements of the search criteria.

The method may further comprise parsing each of the search elements of the search criteria. At least one word is employed for some of the search elements of the search criteria; a suffix table is employed including a plurality of first suffixes and a plurality of corresponding replacement suffixes; and it is determined if any of the words ends in one of the first suffixes of the suffix table and, if so, the one of the first suffixes is responsively replaced with the corresponding replacement suffix.

The method may further comprise employing a string reduction table including a plurality of first character strings, a plurality of corresponding conditions and a plurality of corresponding replacement character strings; and recursively searching for one of the first character strings in any of the words, determining if the corresponding condition is met, and responsively replacing the one of the first character strings with the corresponding replacement character string.

Preferably, the string reduction table is stored in the memory; and the string reduction table may be adjusted.

As another aspect of the invention, a search engine system for searching a database including a plurality of records each of which has a plurality of record fields and a plurality of record elements, comprises: means for receiving a search criteria including a plurality of search elements corresponding to at least some of the record elements of the database, with each of the search elements being capable of returning one or more corresponding search results from the records of the database; means for ordering the search elements of the search criteria based upon an expected size of the corresponding search results from the database; and means for searching the database with one of the search elements, which is expected to provide a first group of the search results,.before searching the database with another one of the search elements, which is expected to provide a second group of the search results, the second group being larger in size than the first group.

As another aspect of the invention, a method of providing a key table for use by a search engine for a database, which includes a plurality of records, with each of the records having a plurality of record fields and a plurality of record elements, comprises: parsing the record elements of the record fields of the database and extracting at least one word for each of the record elements; assigning a field type value to each of the words based upon its origin from a corresponding one of the record fields of the database; assigning a word position value to each of the words based upon its origin from a particular word position in the corresponding one of the record fields of the database; constructing the key table including a plurality of records, each of which corresponds to one of the words; employing a plurality of fields with each of the records of the key table, the fields of the records of the key table comprising a record identifier field, a field type field, a word position field, an original word field, a replacement word field, a consonant key field and a vowel key field; assigning a unique value to each of the record identifier fields; for each of the words, assigning the field type value to a corresponding one of the field type fields, assigning the word position value to a corresponding one of the word position fields, and assigning the word to a corresponding one of the original word fields; employing an array of replacement words including a plurality of records having an original word and a replacement word; for at least some of the words, determining a corresponding one of the replacement words from the array of replacement words and assigning the corresponding one of the replacement words to a corresponding one of the replacement word fields; and for each of the words, determining a corresponding consonant key value and a corresponding vowel key value, assigning the consonant key value to a corresponding one of the consonant key fields, and assigning the vowel key value to a corresponding one of the vowel key fields.

The method may further comprise parsing each of the words. Preferably, at least one word for some of the search elements of the search criteria is employed; a suffix table is employed including a plurality of first suffixes and a plurality of corresponding replacement suffixes; and it is determined if any of the words ends in one of the first suffixes of the suffix table and, if so, the one of the first suffixes is responsively replaced with the corresponding replacement suffix.

The method may further comprise employing a pseudo-phonetic string reduction table including a plurality of first character strings, a plurality of corresponding conditions and a plurality of corresponding replacement character strings; and recursively searching for one of the first character strings in any of the words, determining if the corresponding condition is met and responsively replacing the one of the first character strings with the corresponding replacement character string.

The pseudo-phonetic string reduction table may be stored in memory; and the pseudo-phonetic string reduction table may be adjusted in the memory.

The method may further comprise storing the array of replacement words in a memory before constructing the key table; updating one of the original words or one of the replacement words in the array of replacement words in the memory; and reconstructing the key table after the step of updating one of the original words or one of the replacement words.

BRIEF DESCRIPTION OF THE DRAWINGS

A full understanding of the invention can be gained from the following description of the preferred embodiments when read in conjunction with the accompanying drawings in which:

FIG. 5 is a block diagram of a graphical user interface for entering Search Criteria data for the search engine of FIG. 2.

DESCRIPTION OF THE PREFERRED EMBODIMENTS

The present invention will be described as applied to a relational database, such as a name/address (e.g., name and address) database, although it is to be understood that a wide range of databases (e.g., general web searching on fields that may consist of a web site description or "Meta Tags"; a database about dogs may be mapped to fields such as hair type, color, region; a hospital database on medicines may contain information on side effects, which are mapped to corresponding side effects fields) may be employed.

Figure 1:
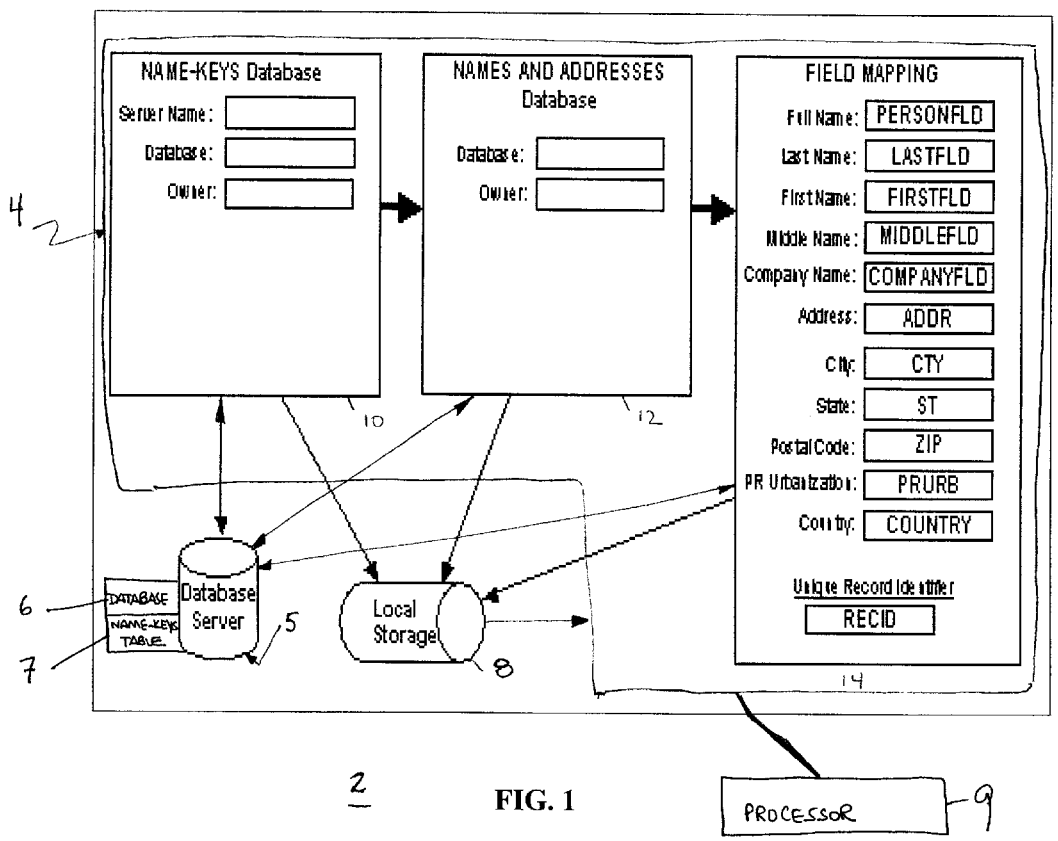
FIG. 1 is a block diagram showing graphical user interfaces of a search engine system for searching a database by enabling the linking of a search engine and an associated name-keys database with an existing name/address database in accordance with the present invention.

FIG. 1 is a block diagram of graphical user interfaces (GUIs) of a database search engine system 2, which enables linking of a search engine 4 with a database server 5 (having a database 6 and an associated name-keys table 7 (not to be confused with Table 7)) and with local storage or file 8 for name/address information. These linkages are performed as part of a set-up process, which is completed prior to any database searches. Typically, database 6 includes a plurality of records each of which has a plurality of record fields and a plurality of record elements.

The system 2 includes a suitable processor, such as, for example, a personal computer 9, which runs the search engine 4 and interfaces the name-keys table 7 and local file 8, although a wide range of other processors such as, for example, mainframe computers, mini-computers, workstations, microcomputers, and other microprocessor-based computers may be employed.

As one non-limiting example, the processor 9 may be a personal computer (e.g., having a 450 MHz processor and 64 Mb memory) including a suitable operating system (e.g., Windows 2000 Server®) and suitable database interface software (e.g., SQL 2000®), although a wide range of operating systems and database software may be employed.

The GUI 10 allows the user to specify the server 5, the name-keys table 7 and the owner of such table, which is generally dedicated for use by the search engine 4. The GUI 12 allows the user to specify the server 5, the name/address database 6 and the owner of such database. Typically, the name/address database 6 is an existing database and is usually configured for access by other software in addition to the search engine 4, although such database 6 may be dedicated to the search engine 4. The GUI 14 enables the user to map the individual record fields in the local file 8 and database 6 to the fields expected by the search engine 4.

The GUI 14 shows a number of exemplary search engine fields such as, for example, "Full Name", "First Name", "Middle Name", "Last Name", "Company Name", "Address", "City", "State", "Postal Code" (e.g., zip code), "PR Urbanization", "Country" and "Record Identifier". Most installations are expected to use some, many or all of these fields, however, the only required field is the "Record Identifier". A unique Record Identifier is employed in order that when the results are returned, the search engine 4 may retrieve the "real record" from the user's database. Any subset of the remaining fields may be mapped or left unmapped. Fields are left unmapped if they either do not exist in the local file 8 and database 6, or if it is determined that the search engine 4 need not, or should not, make use of them. Leaving an entry blank in the GUI 14 indicates that the field should be left unmapped.

After configuration, the software of the search engine 4 is linked to the database 6 containing database records and performs a pre-processing routine 16 as shown in FIGS. 3A–3D. This pre-processing routine 16 extracts information from the records in the database 6 and employs the same to construct a separate database table 18, namely the Key Table of FIG. 2. The Key Table 18 is subsequently employed by the search engine 4 to facilitate searches of the database 6. An example of a Key Table is shown in Table 1.

TABLE 1

| Record Identifier | Field Type | Word Position | Original Word | Replacement Word | Consonant Key | Vowel Key |
|---|---|---|---|---|---|---|
| 000604257894 | 1 | 1 | Bill | William | WLM | IIA |
| 000604257894 | 1 | 2 | Bob | Robert | RBRT | OE |
| 000604257894 | 1 | 3 | Smyth | Smith | SMTH | I |

The Key Table 18 consists of seven fields, or columns, as shown in Table 1. The pre-processing routine 16 places a record into the Key Table 18 for each Word, as defined by the search engine 4, in the database 6. A Word is a character string (e.g., a token) that results from parsing data in a database field with a parsing algorithm 20 of FIGS. 4A and 4B. Specifically, the Key Table 18 has one record for each Word of each field of each record in the database 6.

As shown in Table 1, the fourth column contains the "Original Word", which is the name or address fragment as it was entered, or as it appears in the database 6, verbatim. The fifth column contains the "Replacement Word" which is the name or address fragment after substitution is performed from the "Replacement Word Table" 22 of FIG. 2. The sixth column contains the "consonant key" of the "Replacement Word" after it is subjected to a suitable cleansing process. The seventh column contains the "vowel key" of the "Replacement Word" after it is subjected to a suitable cleansing process. The third column contains the "word position" of the fragment, or the ordinal position of the fragment relative to all other fragments in the name or address under consideration. The Key Table 18 may also include an "alternate key", which is discussed below in connection with FIG. 4C.

Figure 2:
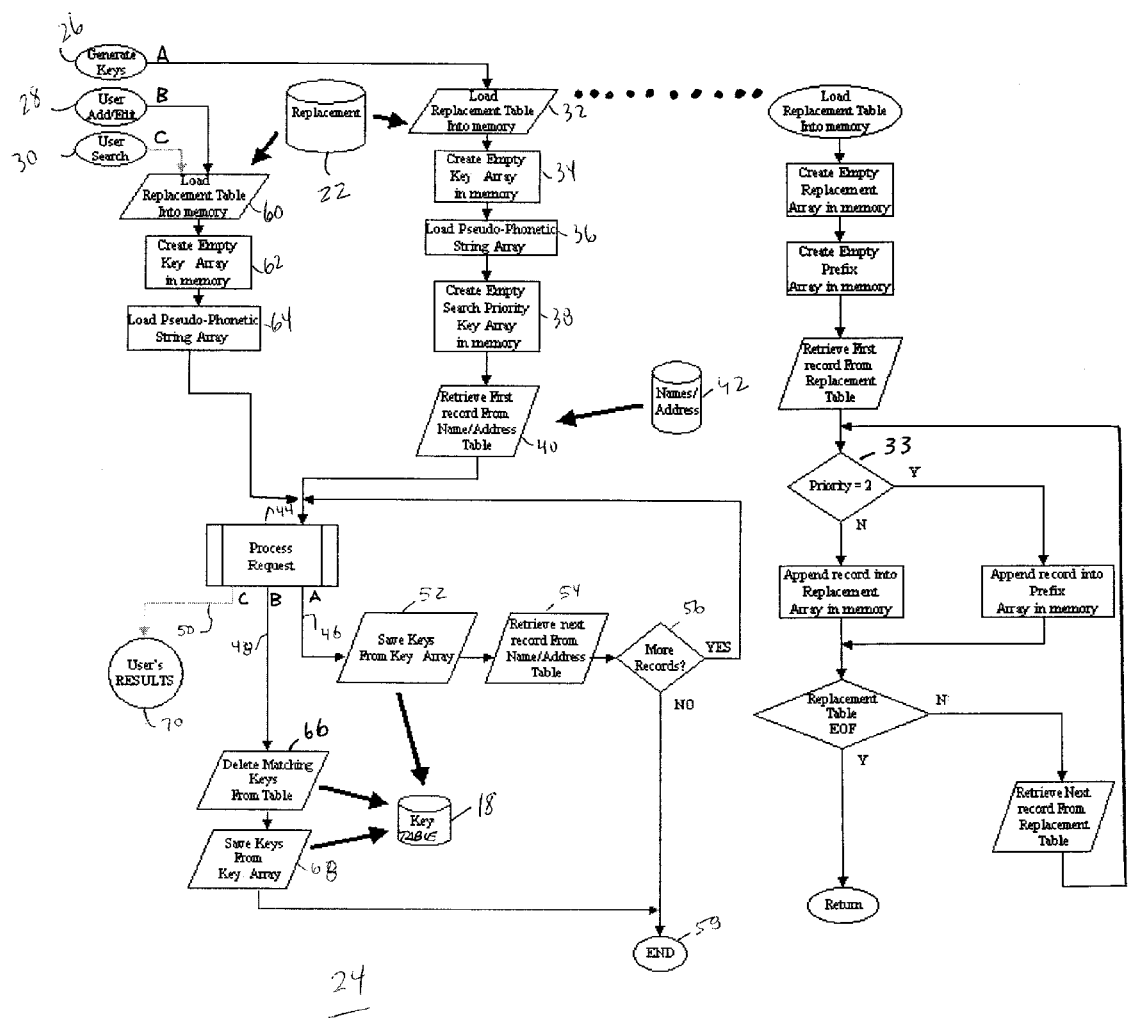
FIG. 2 is block diagram and flowchart of a search engine in accordance with an embodiment of the present invention.

FIG. 2 shows the process 24 for generating the Key Table 18, adding or editing entries in the Key Table 18, and conducting searches by the search engine 4. The process 24 is responsive to one of three different user requests: (1) a generate keys request 26; (2) a user add/edit keys request 28; and (3) a user search request 30. Responsive to the generate keys request 26, at 32, the Replacement Word Array is loaded into memory (e.g., of processor 9 of FIG. 1) from the Replacement Word Table 22. At 32 (or 60), the Prefix Array is loaded from the Replacement Word Table 22 using a predetermined priority of "2". At 33, if the Priority field from the current record of the Replacement Word Table 22 contains the number "2", then that record is loaded into the Prefix Array in memory, otherwise this record is loaded into the Replacement Word Array in memory. Combining the Prefix Table and Replacement Words into one table (i.e., the Replacement Word Table 22) is preferably done to avoid a second call (if there were two tables) to the name-keys table 7 for faster loading of the two arrays.

Next, at 34, an empty Key Array is created in memory. At 36, a Pseudo-Phonetic String Reduction Array 245 (FIG. 4C) is loaded into memory from a corresponding Pseudo-Phonetic String Reduction Table (see Table 6, below). Then, at 38, an empty Search Priority Key Array 309 (FIG. 4D) is created in memory. Next, at 40, the first record is retrieved from a names/addresses table 42. The field mapping from FIG. 1 is stored locally in the file 8 (e.g., for Microsoft®, the registry) and resides where the search engine 4 is installed. The mapping information is employed to obtain the records (e.g., database server, table names, field names) each time the search engine 4 is called.

Figure 4A:
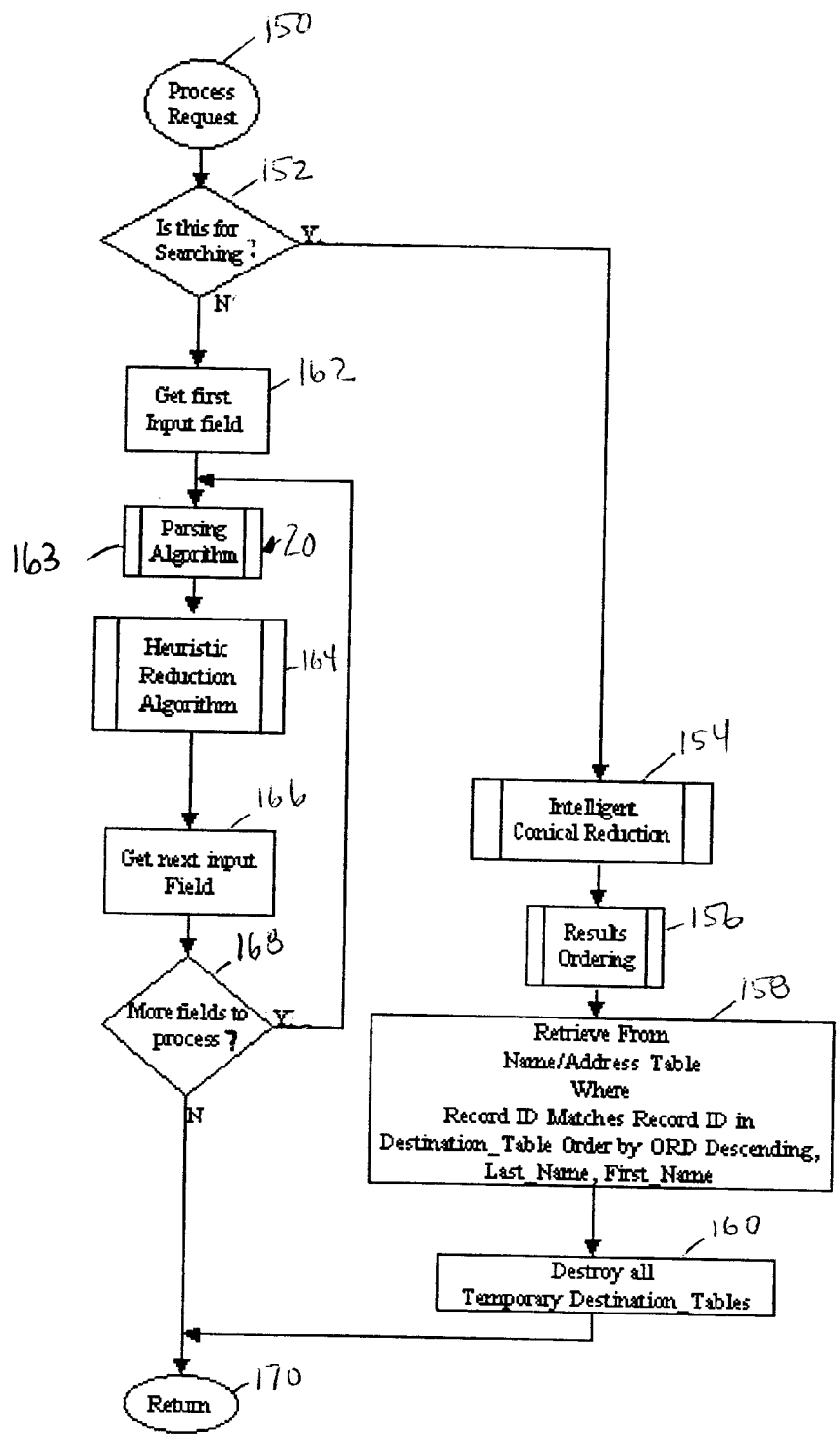
FIGS. 4A–4F are flowcharts of request processing routines for the search engine of FIG. 2.

Following step 40, the process request routine 44 of FIG. 4A is executed. For ease of disclosure, the routine 44 is shown with three output paths A 46, B 48 and C 50, which correspond to the respective requests 26, 28 and 30, although it is to be understood that three separate routines 44 or a single routine with a single return to its calling routine may be provided. Following steps 40 and 44 to output path A 46, at 52, the Keys from the Key Array (e.g., from steps 260,262 of FIG. 4C) are saved in the Key Table 18. Next, at 54, the next record is retrieved from the names/addresses table 42. If, however, there are no more such records, at 56, then the process 24 exits at 58. On the other hand, if there are one or more such records, at 56, then the routine 44 is executed.

Following the user add/edit keys request 28, and similar to steps 32, 34 and 36, at step 60, the Replacement Word Array is loaded into memory from the Replacement Word Table 22. Next, at 62, an empty Key Array is created in memory. At 64, a Pseudo-Phonetic String Reduction Array 245 (FIG. 4C) is loaded into memory from a corresponding Pseudo-Phonetic String Reduction Table (see Table 6, below). Then, the process request routine 44 of FIG. 4A is executed. Following steps 64 and 44 to output path B 48, at 66, any matching Keys are deleted from the Key Table 18. Next, at 68, the added or edited Keys from the Key Array (e.g., from steps 260,262 of FIG. 4C) are saved in the Key Table 18 before the process 24 exits at 58.

Following the user search request 30, the steps 60, 62 and 64 are executed as discussed above in connection with the user add/edit keys request 28. Following steps 64 and 44 to output path C 50, at 70, the user's results are provided as discussed below in connection with the Results Ordering Algorithm 156 of FIG. 7.

FIGS. 3A–3D show simplified flowcharts of the key generation routines as employed by the pre-processing routine 16. After starting at 80 of FIG. 3A, the pre-processing routine 16 first gathers information to be stored in the file 8 of FIG. 1, and assigns the name-keys table 7 of FIG. 1, at 82, and the names/addresses table 42 of FIG. 3B at 84. Next, at 86, the mapping information is stored in the local file 8 from the fields in the names/addresses table 42 to their associated mapping names as shown in FIG. 1 at 14. At 88, the Key Table 18, the Replacement Word Table 22 and the stored procedures are created, before the Generate Keys routine 90 (FIG. 3B) is executed. Three SQL stored procedures on the Database SQL Server are created to allow users the flexibility to modify them as needed. (SQL stored procedures are specific to SQL servers and are code that can be executed by a SQL Server.) The stored procedures include: (1) NAGlobal_GetRecById has one input parameter which is the record identifier; the resulting fields that are returned are user configurable; (2) NAGlobal_GetRecs has one input parameter, "temp table name", that allows the user to add a return field named "Other" (for assignment of other information for display in the resulting list of records); and (3) NAGlobal_InsertUpdate uses the field mapping information identified in FIG. 1 at 14 to be used as the input parameters. This allows the user the flexibility to add additional code to the stored procedure for any additional requirements. It is also not called by the search engine itself and is provided only as a convenience.

Figure 3A:
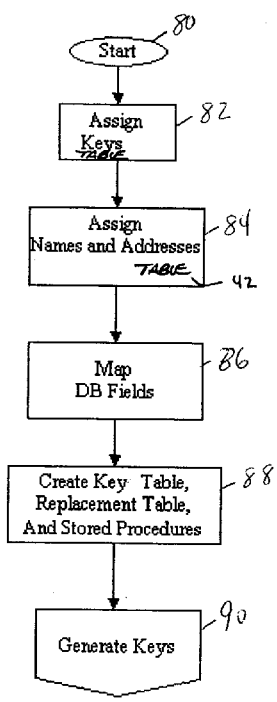
FIGS. 3A–3D are simplified flowcharts of key generation routines for the search engine of FIG. 2.
Figure 3B:
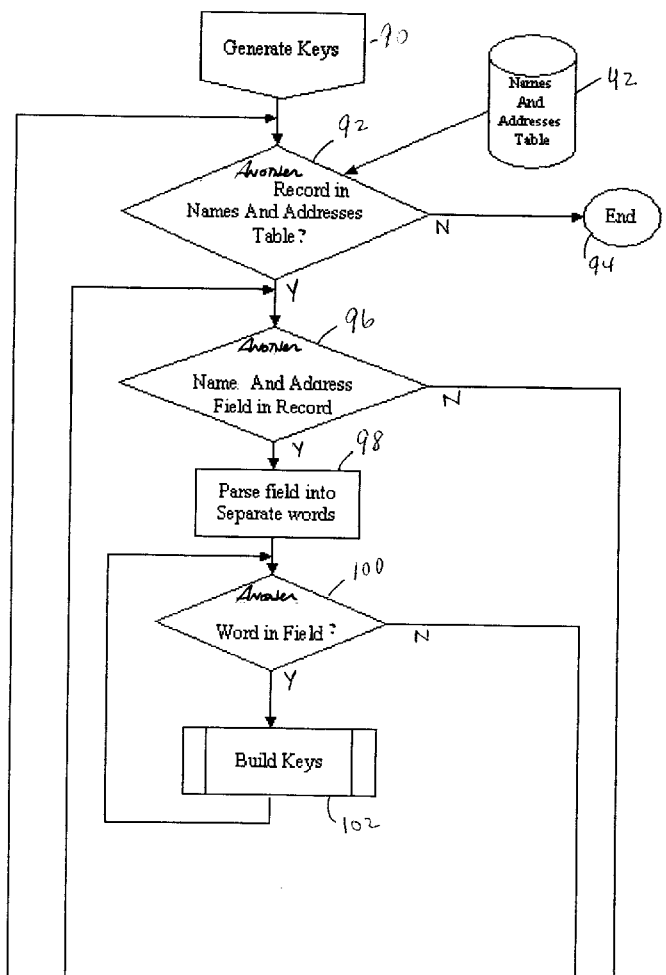

At 92 of FIG. 3B, it is determined if there is another record in the names/addresses table 42. If not, then the routine 90 exits at 94. On the other hand, if there is another record in the names/addresses table 42, then the pre-processing routine 16 loops through each mapped field in the current record until there are no more mapped fields to process. At 96, if there is no name and address field in the current record, then step 92 is repeated. Otherwise, if there is another field, then at 98, the field is parsed into separate words. Next, at 100, it is determined if there is another word in the current field. If not, then step 96 is repeated. Otherwise, if there is another word, then at 102, the Build Keys routine 102 of FIG. 3C is executed before step 100 is executed.

Figure 3C:
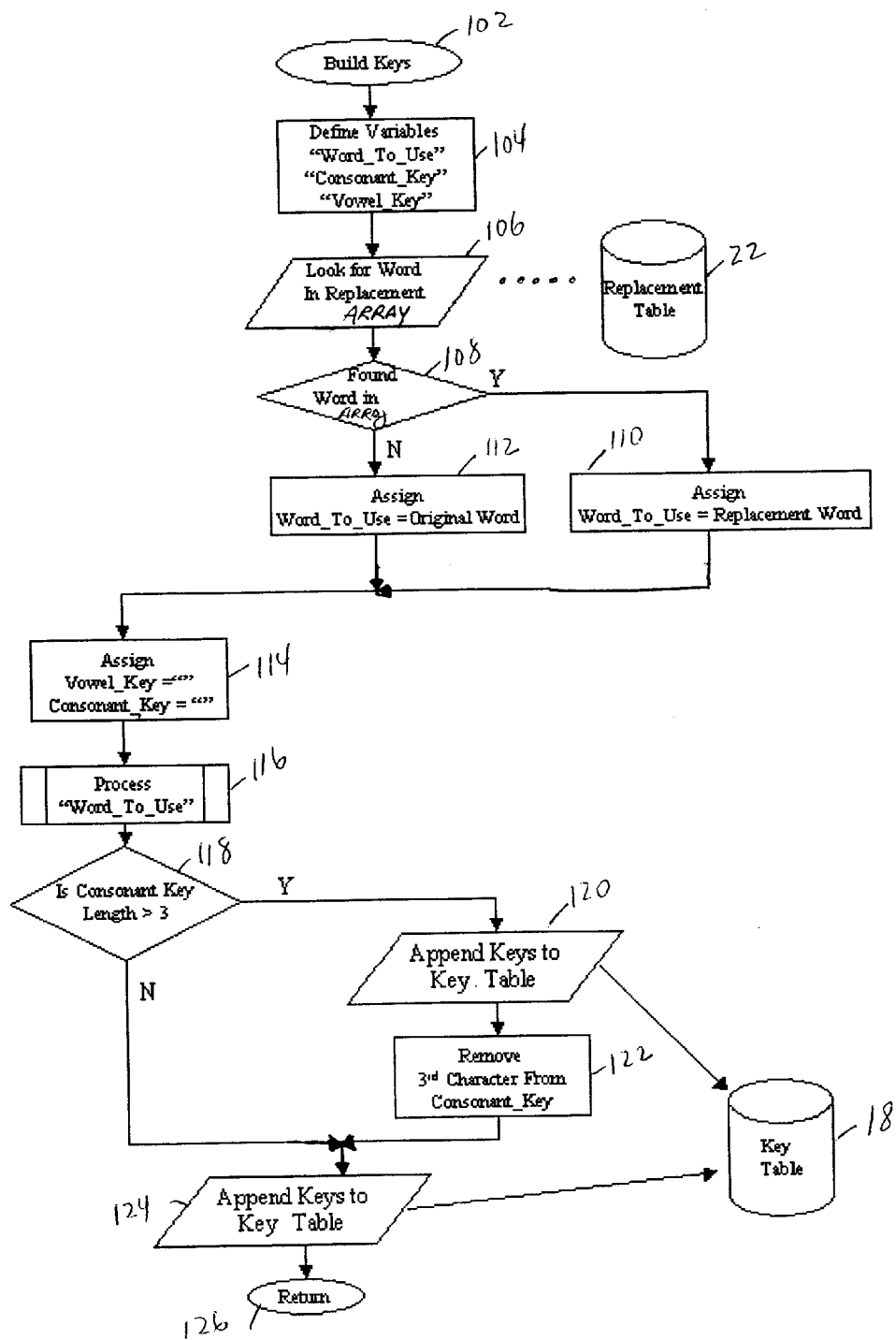
Figure 3D:
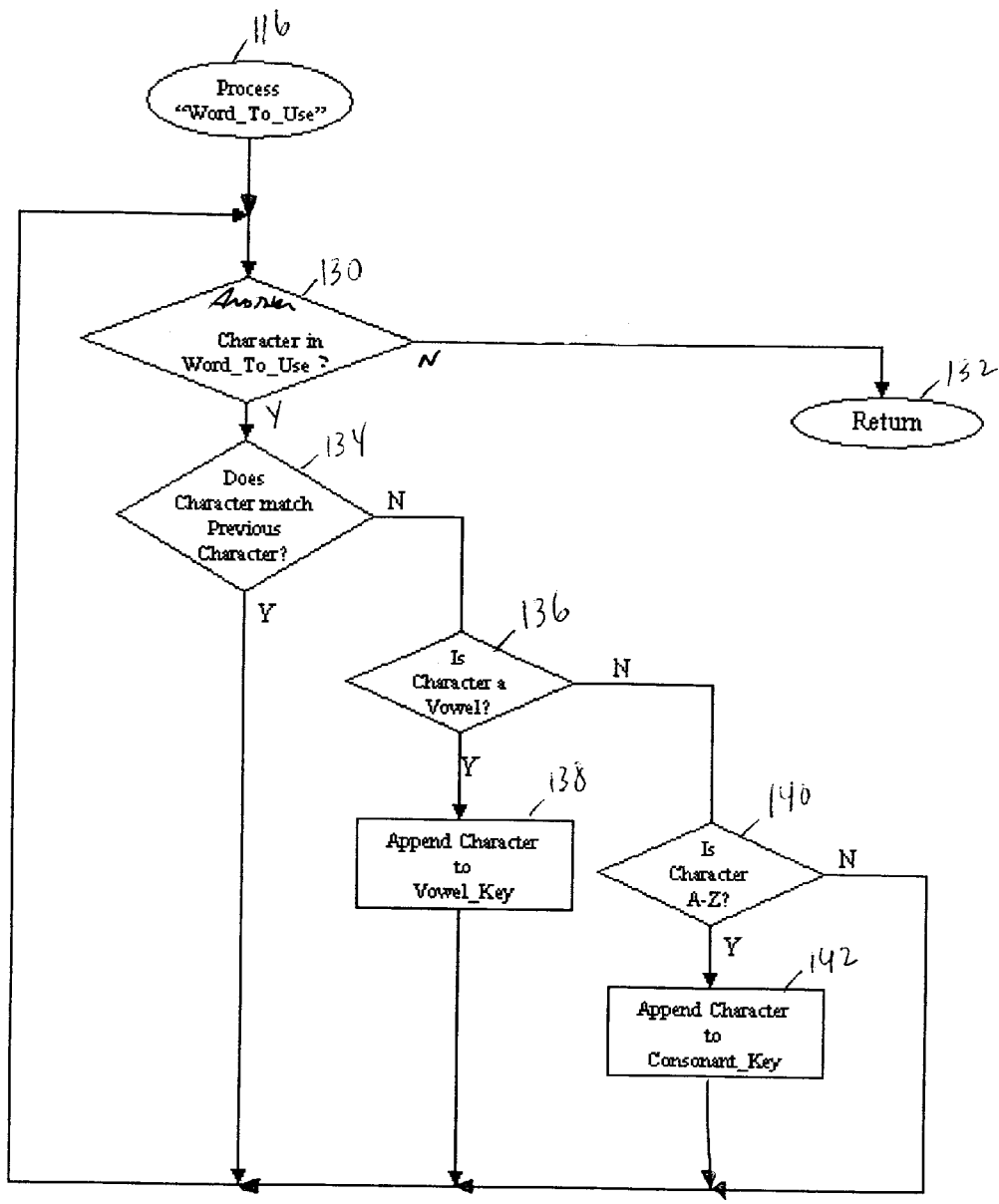

FIG. 3C shows the Build Keys routine 102. The functions of FIGS. 3C and 3D are discussed in greater detail, below, in connection with FIGS. 4B and 4C. First, at 104, the variables "Word_To_Use", "Consonant_Key" and "Vowel_Key" are defined. Next, at 106, the word, as detected at 100, is looked for in the Replacement Word Array (which was loaded into memory from the Replacement Word Table 22 at 32 of FIG. 2). At 108, if the word is found in the Replacement Word Array, then the variable "Word_To_Use" is set equal to the Replacement Word from the Replacement Word Array. Otherwise, if the word was not found in the Replacement Word Array, then the variable "Word_To_Use" is set equal to the Original Word, which was detected at 100.

Following either step 110 or 112, at 114, the variables "Vowel_Key" and "Consonant_Key" are both set equal to an empty string of characters. Next, the Process "Word_To_Use" routine 116 (FIG. 3D) is executed. After the routine 116, at 118, it is determined if the "Consonant_Key" length, as established at step 142 of FIG. 3D, has a length of greater than three characters. If so, then at 120, the Keys are appended to the Key Table 18 and, at 122, the third character is removed from the "Consonant_Key". On the other hand, if the "Consonant_Key" length, at 118, is three or less, or after step 122, then the Keys are appended to the Key Table 18. Finally, the routine 102 returns at 126. Steps 120 and 124 update the Record Identifier from the Name and Address record, Original Word (Real Name), Replacement Word (Name), Consonant Key, Vowel Key, Word Position, and Field (Word) type.

FIG. 3D shows the Process "Word_To_Use" routine 116. First, at 130, it is determined if there is another character in "Word_To_Use". If not, then the routine 116 returns at 132. Otherwise, at 134, it is determined if the current character from the "Word_To_Use" matches the previous character from the "Word_To_Use". If so, then step 130 is repeated to determine if there is another character in "Word_To_Use", thereby skipping any consecutive matching characters. If not, then at 136, it is determined if the current character is a vowel. If so, at 138, the current vowel character is appended to the "Vowel_Key" before step 130 is repeated. On the other hand, if the current character is not a vowel, at 140, it is determined if the current character is any character between A and Z, inclusive, thereby determining if the current character is a consonant. If so, at 142, the current consonant character is appended to the "Consonant_Key" before step 130 is repeated. Otherwise, if the current character was neither a vowel nor a consonant (e.g., a number, a punctuation mark), then step 130 is repeated.

Figure 4B:
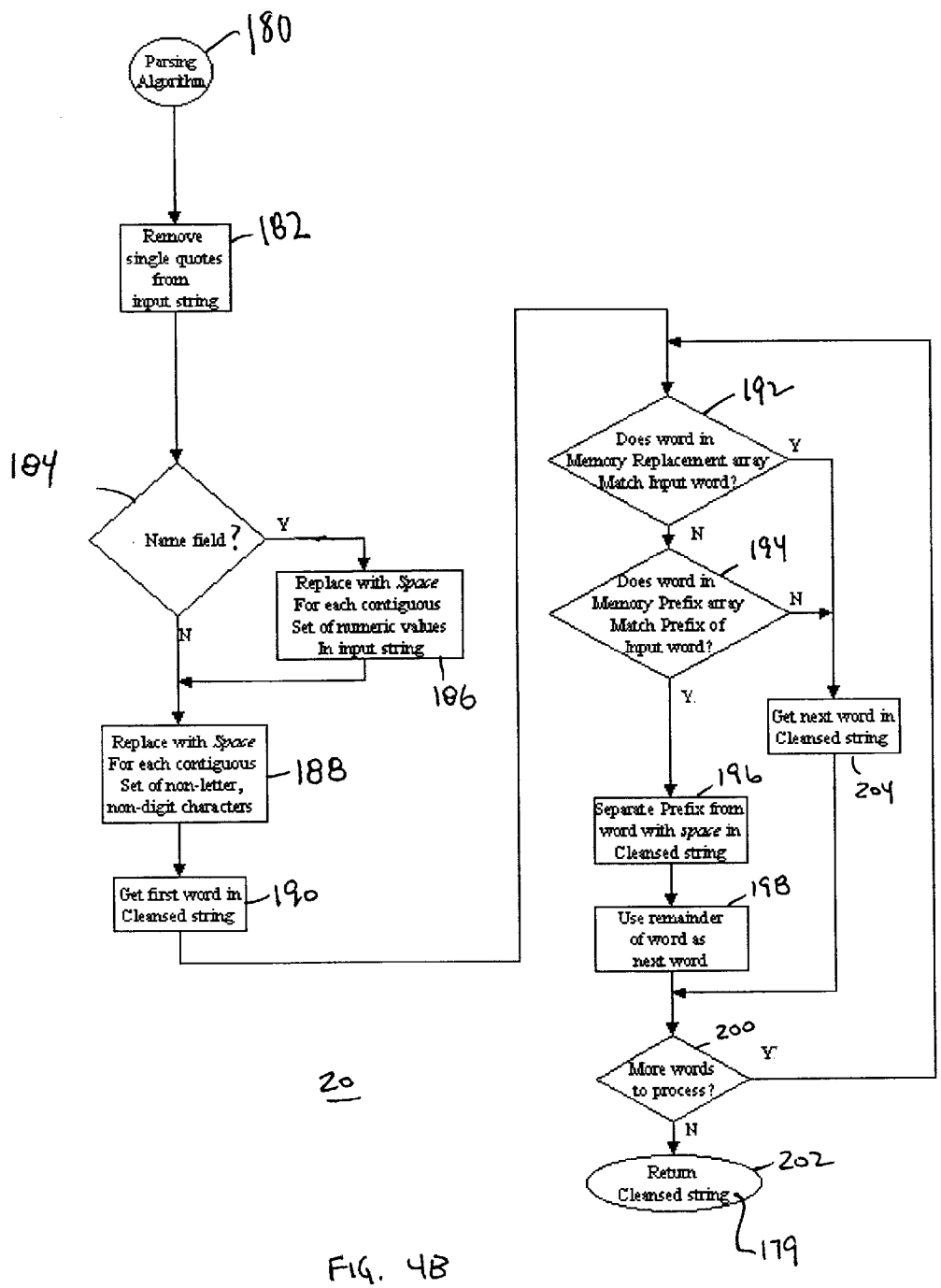
Figure 4C:
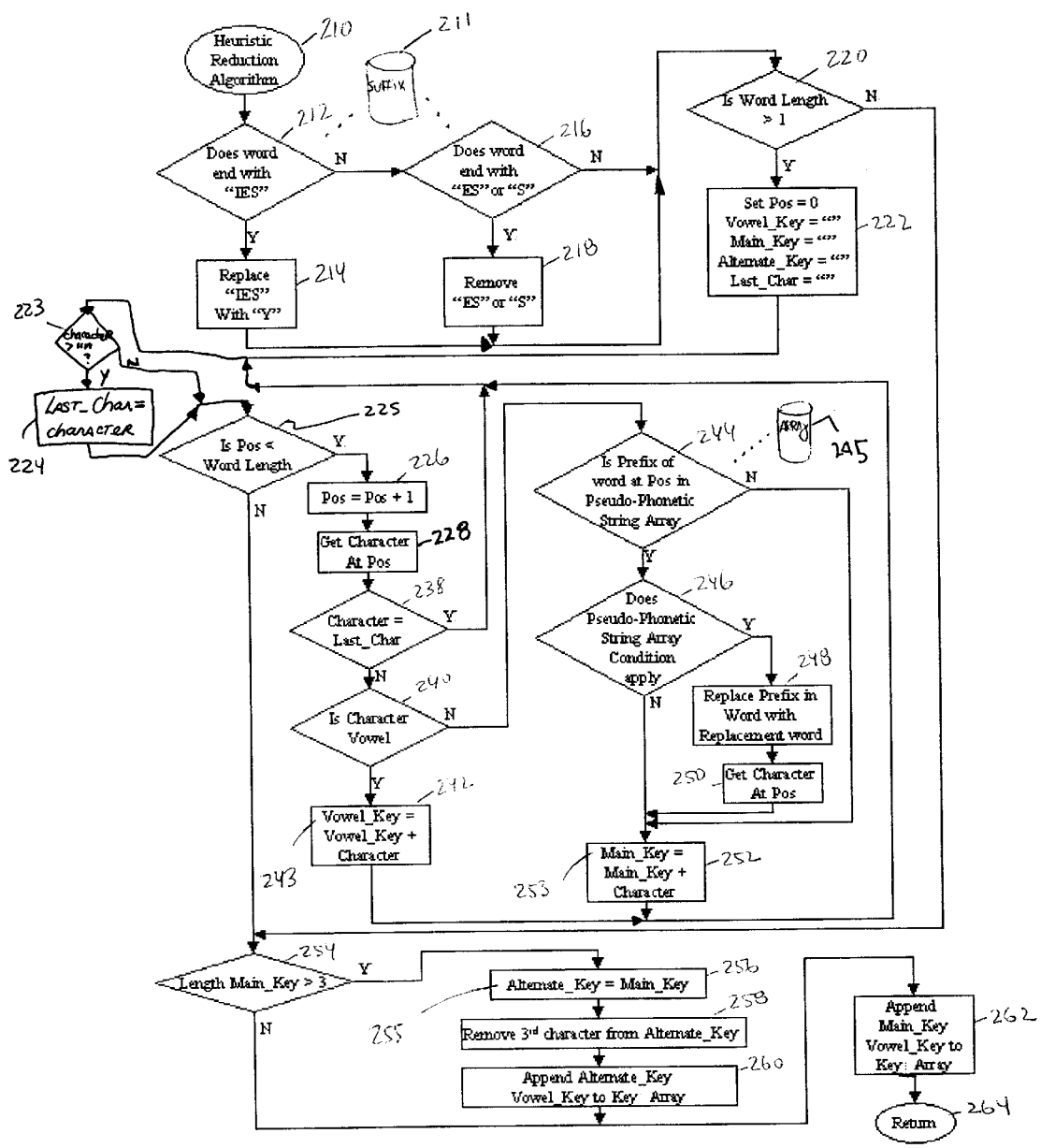
Figure 4D:
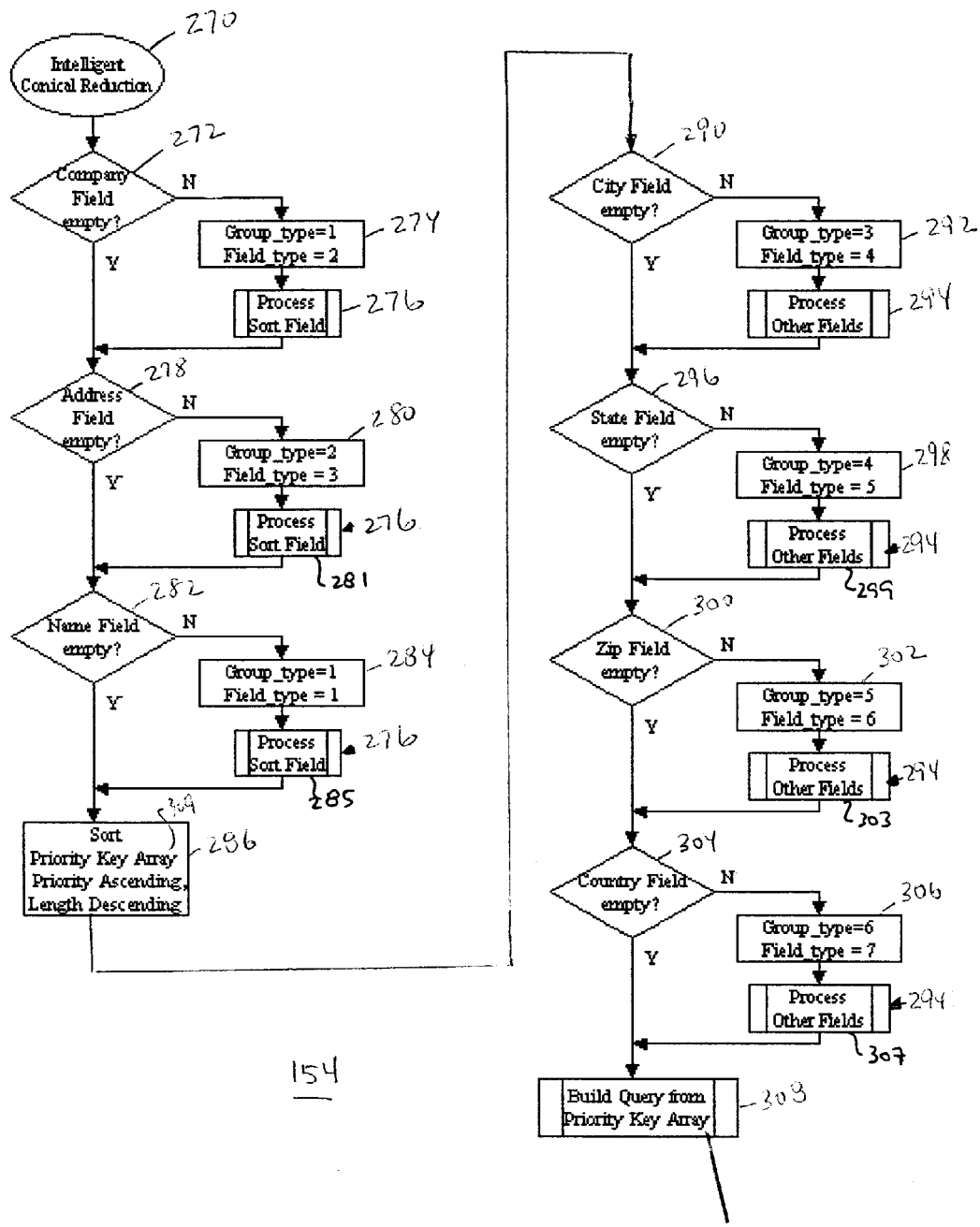
Figure 7:
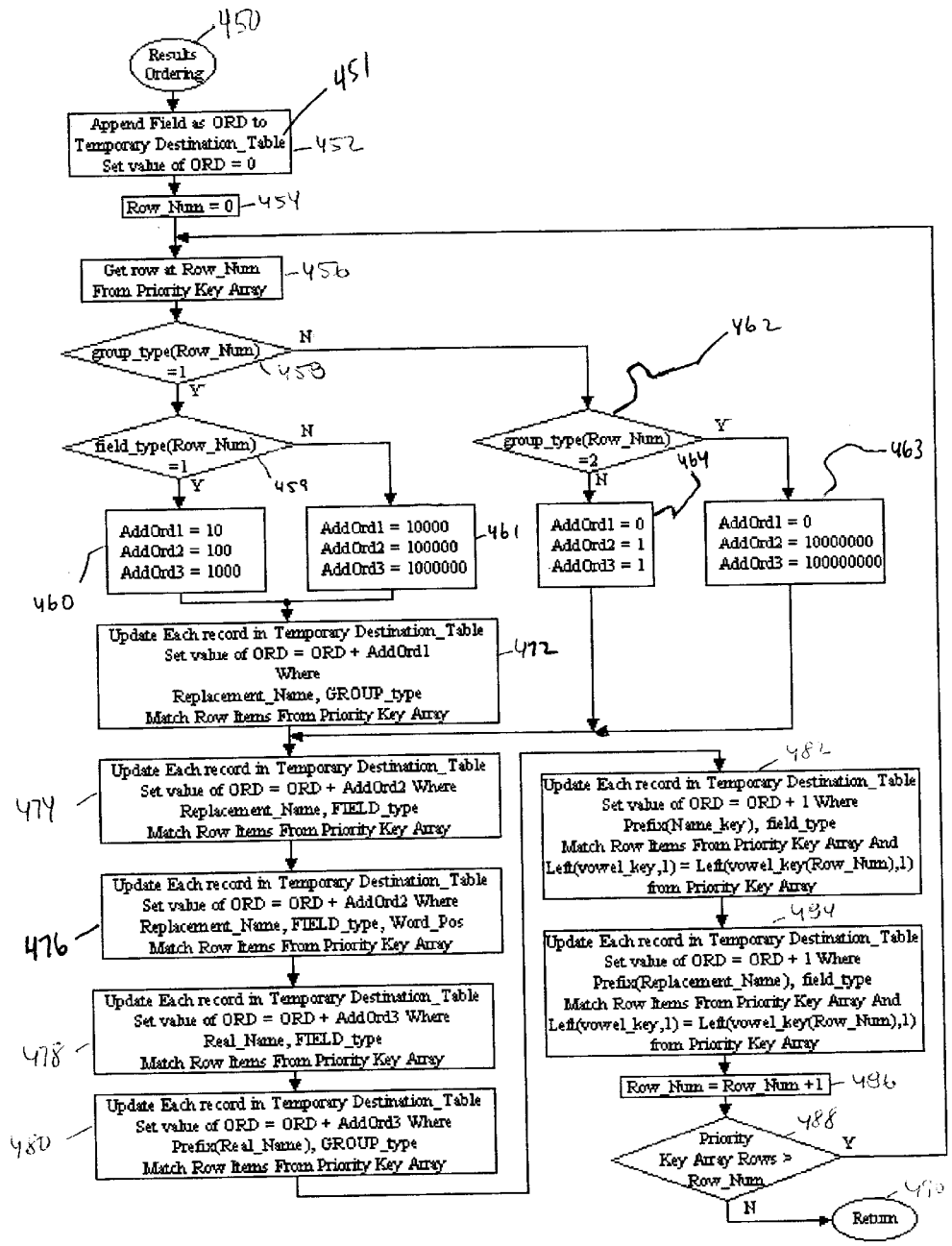
FIG. 7 is a flowchart showing the algorithm for scoring and ordering records in the result set of FIG. 2.

FIG. 4A shows the process request routine 44 of FIG. 2. After starting, at 150, the routine 44 determines if the request is for searching (as initiated at step 30 of FIG. 2), at 152. If so, then the Intelligent Conical Reduction Algorithm 154 of FIG. 4D is executed. Next, the Results Ordering Algorithm 156 of FIG. 7 is executed. Then, at 158, the search results are retrieved from the names/addresses table 42 of FIG. 2, where the Record ID in such table 42 matches the corresponding Record ID of the Temporary Destination_Table of the Algorithm 156 of FIG. 7. Those search results are preferably ordered by descending values of ORD and include the Last_Name followed by the First_Name. This step may call the stored procedure "NAGlobal_GetRecs" which returns the results as stated, but can be modified by the user. At 160, the Temporary Destination_Tables are destroyed before the routine 44 returns at 170. The Conical Reduction Algorithm 156 uses as many temporary tables as there are words to be searched against. The last temporary table (temp table #0) is employed at 158.

On the other hand, if the request is not for searching (as initiated at step 26 or 28 of FIG. 2), at 152, then the first input field is obtained at 162. Next, at 163, the Parsing Algorithm 20 of FIG. 4B is executed. Then, the Heuristic Reduction Algorithm 164 of FIG. 4C is executed. At 166, the next input field is obtained. Next, at 168, it is determined if there are any more fields to process. If so, then step 163 is repeated. Otherwise, the routine 44 returns at 170.

Referring to FIG. 4B, the Parsing Algorithm 20 receives, as input, a string of characters that may contain letters, numbers, spaces, punctuation marks and other characters. The Parsing Algorithm 20 produces, as its output 179, a sequence of one or more other cleansed strings, most of which are sub-strings of the original string. These output strings are referred to as "Words" (e.g., tokens). A Word is defined to be a string that contains only letters and/or numbers and excludes other characters (e.g., spaces, punctuation marks).

After starting, at 180, the Parsing Algorithm 20 removes, at 182, all apostrophes or single quotes from the input string. This transforms words such as, for example, "watson's" and "o'riley" into "watsons" and "oriley", respectively. If multiple consecutive apostrophes are encountered, then the algorithm 20 behaves in a similar fashion. For example, "don't" is transformed into "dont".

Next, at 184, if the field being parsed is a name field or a company field, then, at 186 and 188, the parsing algorithm 20 examines the input string and considers all non-letter characters to be delimiters of the Words in the string. Specifically, digits (or numeric values at step 186) and spaces, tabs, punctuation marks and all other non-letter characters (step 188) are considered delimiters. For example, if the input string is "Best4You Building Supplies", then the following set of four Words is provided: "Best", "You", "Building", and "Supplies".

On the other hand, if the field being parsed is not a name field or a company field (e.g., if it is an address, city, state, zip, Puerto Rico (PR) urbanization, or country field), then, at 188, the parsing algorithm 20 examines the input string and considers all non-letter, non-digit characters, to be delimiters of the Words in the string. Specifically, spaces, tabs, punctuation marks and all other non-letter, non-digit characters are considered delimiters. For example, if the input string is "12 Allen-Vancarson Ave. Apt 3", then the following set of six Words is produced: "12", "Allen", "Vancarson", "Ave", "Apt", and "3".

Next, at 190, the first word in the cleansed string is obtained. Steps 192,194,196,198,200,204 of the Parsing Algorithm 20 compare each of the words produced by steps 182,184,186,188,190 against the Prefix Table, which is created in memory from the values in the Replacement Word Table 22 of FIG. 2 that have a priority of "2". The Prefix Table is a table containing prefixes of words that should be parsed from the input words when one of such input words begins with a prefix. The Prefix Table contains a list of character strings to be processed as "word prefixes". Table 2 is an example of a portion of the Prefix Table with some sample data.

TABLE 2

| Prefix |
| --- |
| VAN |
| VON |
| DELA |

At 192, it is determined if a word in the Replacement Word Array (which was loaded into memory from the Replacement Word Table 22 at 32 of FIG. 2) matches the current input word. If not, then at 194, it is determined if a word in the Prefix Array (which was also loaded into memory from the Replacement Word Table 22 at 32 of FIG. 2) matches the prefix of the current input word. If so, then the Prefix is separated from the current input word in the cleansed string by a "space" at 196, and the remainder of the word is employed as the next word at 198. Next, at 200, it is determined if there are any more words to process. If so, then step 192 is repeated. Otherwise, the cleansed string 179 is output at 202. On the other hand, if the test of 192 is yes or the test of 194 is no, then, at 204, the next word in the cleansed string is obtained before step 200 is executed.

To continue with the example, above, for step 188, when the six Words are examined against the Prefix Table (e.g., Table 2), five of those words are unaffected. Specifically, "12", "Allen", "Ave", "Apt", and "3" are unaffected. The word "Vancarson", however, begins with "Van" which is found to be one of the prefixes in the Prefix Table. Thus, "Vancarson" is parsed further, at 196, into two separate Words, "Van" and "carson". The word "carson" is then recursively checked, after 200, at 192, against the Prefix Table to see if it contains a prefix. In this example, it does not so it would be unaffected by this second check. The final result of the even steps 192–204 is seven Words: "12", "Allen", "Van", "carson", "Ave", "Apt", and "3".

As a further example to illustrate the recursive nature of the even steps 192–204 for the Prefix Table (e.g., Table 2), consider the word "vonvandelatora". This word is first parsed into "von" and "vandelatora", then "vandelatora" is parsed into "van" and "delatora", then "delatora" is parsed into "dela" and "tora", and then "tora" is checked against the Prefix Table and remains unchanged. In this manner, the Parsing Algorithm 20 parses "vonvandelatora", recursively, into four words: "von", "van", "dela" and "tora".

As a still further example of the even steps 192–204 for the Prefix Table, consider the word "advance". This word contains the string "van", which is listed in the Prefix Table of Table 2, but it is not at the beginning of the word. Therefore, "advance" is unaffected and this word is output without any parsing.

To construct the Key Table 18 of FIG. 2, every mapped field of every record of the database 6 of FIG. 1 is examined. Each mapped field is parsed with the Parsing Algorithm 20 of FIG. 4B, and an entry is made in the Key Table 18 for each word that results from the Parsing Algorithm 20. As shown in Table 1, above, the first column or field of the Key Table 18 is the unique "Record Identifier", which provides a mechanism for uniquely identifying the record containing this word in the database 6. For example, if the database 6 contains a record with Record Identifier 000604257894, then any entry in the Key Table 18 that pertains to this record will have 000604257894 in the "Record Identifier".

The second column or field is the "Field Type", which contains a code indicating the type of field of this entry. In the exemplary embodiment, seven Field Types are employed: Name=1, Company=2, Address=3 (and/or PR Urbanization=3 (not shown)), City=4, State=5, Zip=6, and Country=7, although the invention is applicable to a wide range of counts (e.g., two or more) of Field Types. An exemplary listing of Field Types is shown in Table 3, which shows the correspondence between the various name/address fields and the Field Type codes. All of the sample data in Table 1, above, has data with a Field Type of 1. This indicates that this data is from a Name field. Thus, the Field Type is readily determined from the field related to the entry in the Key Table 18.

The Field Type Table assigns Field Type=1 to each component of the name and address. This allows various components of the name/address entry to be processed together. For example, Full Name, First Name, Middle Name and Last Name are all of Field Type=1 and, hence, First Name, Middle Name and Last Name are processed together. The result is that matches are found even if it is not clear which parts of the name is the individual's first, middle or last name.

TABLE 3

| Name | Field Type Code | Group Number | Field Sort Order |
|---|---|---|---|
| Full Name | 1 | 1 | 4 |
| First Name | 1 | 1 | 4 |
| Middle Name | 1 | 1 | 4 |
| Last Name | 1 | 1 | 4 |
| Company | 2 | 1 | 1 |
| Address | 3 | 2 | 2 |
| City | 4 | 3 | 3 |
| State | 5 | 4 | 5 |
| Zip | 6 | 5 | 6 |
| Country | 7 | 6 | 7 |

The third column or field of the Key Table 18 is the "Word Position", which indicates the ordinal position of the word within the field after the field has been parsed into individual words. For example, if the Full Name field contains the entry "Bill Bob Smyth", then three entries are made in the Key Table 18 as shown in Table 1. The Word Position of "Bill" is "1", "Bob" is "2", and "Smyth" is "3", since these three words were parsed from the string "Bill Bob Smyth". Further, the Field Type of each of these entries is "1", since they were obtained from the Full Name field, which has a Field Type of "1" as indicated in Table 3.

The fourth column or field in the Key Table 18 is the Original Word field. This field contains the word exactly as it appears after the parsing operation, which isolates it from the rest of the string.

The last three columns or fields in the Key Table 18 are the Replacement Word, and the Consonant Key and the Vowel Key, which are obtained from step 110 of FIG. 3C, and steps 142 and 138 of FIG. 3D (and the Heuristic Reduction Algorithm 164 of FIG. 4C), respectively.

Referring again to FIG. 2, the fifth field or column of the Key Table 18, the "Replacement Word", is derived from a Replacement Word Array, which is loaded into memory (e.g., RAM memory), at 32, from the Replacement Word Table 22. The Replacement Word Array and the Replacement Word Table 22 have identical structures and can be referred to interchangeably except that the array exists in memory and the table exists in the table 7 of FIG. 1. An example of a portion of the Replacement Word Table 22 is shown in Table 4, below. For example, by dynamically loading the Replacement Word Table 22 from the database into RAM, a substantial speed advantage is provided in that the Replacement Word Array is accessed many times during the acquisition of the Replacement Words for the Key Table 18.

The Replacement Word Table 22 contains a list of "Original Words" and for each "Original Word" provides an associated "Replacement Word". Table 4 is populated so as to relate known spelling variations of "Original Words" to a common root, or key, for those names that appear in the Replacement Word field. For example, the Original Words "abdel", "abdou", and "abduh" are all mapped to the Replacement Word "abdul". This enables the search engine 4 of FIG. 1 to associate seemingly unrelated names based on domain-specific knowledge, specifically, in this case, common spelling variations of names.

Table 4

| Original Word | Replacement Word | Priority Constant |
|---|---|---|
| AAN | ANNETTE | 1 |
| AARON | AHRON | 1 |
| ABBI | ABBEY | 1 |
| ABDEL | ABDUL | 1 |
| ABDOU | ABDUL | 1 |
| ABDUH | ABDUL | 1 |
| ABE | ABEL | 1 |
| ABRAMSON | ABRAMS | 1 |
| ACCOUNT | | 6 |
| ADRIANA | ADRIAN | 1 |

Although not shown in Table 4, the Replacement Word Table 22 may contain words which, based on knowledge of the subject domain, can be reduced into synonymous words. For example, the words "Bill", "Billy", "Will", "Willy" and "William" may all have entries in the Replacement Word Table 22 with the Replacement Word of "William".

As shown in FIG. 3C, to obtain the fifth field in the Key Table 18, the Replacement Word, an attempt is made, at 106, to locate the Original Word in the Original Word field of the Replacement Word Array. If the Original Word is found and has a corresponding non-null entry in the Replacement Word field, at 108, then the entry in the Replacement Word field of the array is used as the Replacement Word at 110. On the other hand, if the Original Word is found and has a corresponding entry in the Replacement Word field that is null (e.g., as shown in Table 4 with the Original Word ACCOUNT), or if the Original Word is not found in the Replacement Word Array, then the Original Word is used as the Replacement Word, at 112.

Maintaining the Replacement Words in a database table, such as 22, as opposed to hard coding them in the program, has a number of advantages. For example, the Replacement Word Table 22 may be dynamically changed without necessitating recompilation of code or rebuilding the entire Key Table 18. Specifically, if the Replacement Words are hard coded and this list becomes modified, for example, through version update, then the entire Key Table 18 would have to be rebuilt, which could take a number of hours, if not days. Alternatively, keeping the Replacement Words in the Key Table 18 enables such Table to be synchronized with the Replacement Word Table 22 by updating only the relatively few entries in the Key Table 18 that are affected by changes to the words in the Replacement Word Table 22. Hence, the Replacement Word Table 22 and the Key Table 18 can be maintained in real time. This aspect of the Tables 18 and 22 is discussed in greater detail, below, in connection with FIG. 6.

Referring to FIG. 4C, the Heuristic Reduction Algorithm 164 processes each word in the Replacement Word field of the Key Table 18 of FIG. 2 with the following three-step algorithm. At the completion of this algorithm, the resulting word is used to produce the Consonant Key and the Vowel Key in the Key Table 18. Specifically, the Heuristic Reduction Algorithm 164 receives a single word as input and performs the following three general functions: (1) even steps 212–218; (2) steps 220, 222, 223–225 and even steps 226–238; and (3) even steps 240–252.

First, after stating at 210, the Heuristic Reduction Algorithm 164 determines at even steps 212–218 if the single word ends in one of the suffixes listed in a Suffix Table 211. Table 5, below, shows an example of a Suffix Table with some sample data. The exemplary even steps 212–218 implement that sample data, although a wide range of Suffix Table data and corresponding replacement steps may be employed. The Suffix Table contains a list of character strings to be considered "word suffix" and for each suffix gives the replacement value. If the word ends in a suffix listed in the Suffix Table, then the suffix is replaced with the Replacement Suffix listed in such Suffix Table. For example, if the original word is "Fries", then each of the suffixes in the Suffix Table is checked (e.g., in the order listed), against the input word "Fries". In this example, the Algorithm 164 determines that the suffix of "Fries" is "ies" and, thus, replaces this Suffix with the Replacement Suffix "y". Hence, "Fries" is changed to "Fry".

In particular, at 212, it is determined if the current word ends with "ies". If so, then "ies" is replaced with "y" at 214, after which execution resumes at 220. Otherwise, at 216, it is determined if the current word ends with "es" or "s". If so, then the "es" or "s" is removed at 218, after which execution resumes at 220. Regardless, if the tests of steps 212 and 216 are not met, then step 220 is executed.

As another example, step 216 determines whether the suffix is "es" or "s" and, if so, removes the suffix at 218. For example, "Acorns" would be replaced by "Acorn".

TABLE 5

| Suffix | Replacement Suffix |
| --- | --- |
| IES | Y |
| ES | |
| S | |

As the second function of the Algorithm 164, steps 220, 222, 223–225 and even steps 226–238 recursively remove all consecutive duplicate characters from the Word. Specifically, any two consecutive identical characters are replaced, by the test at 238 (since steps 242 or 252 are not executed for this iteration), with a single occurrence of that character and then step 223 is repeated. For example, if the input word is "carr", an application of step 238 changes this word to "car". Similarly, if the input word is "99999thh", then step 238 eventually reduces this string to "9th".

First, at 220, it is determined if the word length is greater than 1. If not, then execution resumes at 254. Otherwise, at 222, variables are initialized as follows: Pos=0; Vowel_Key=""; Main_Key=""; Alternate_Key=""; and Last_Char="", wherein "" represents an empty string of characters. At 223, it is determined if the current character is greater than "". If so, then at 224, Last_Char is set equal to the current character. If not, or after 224, at 225, it is determined if Pos is less than the word length. If not, then execution resumes at 254. Otherwise, at 226, Pos is incremented by one and, at 228, the character at Pos is obtained. Then, at 238, if the character from step 228 is equal to Last_Char (from the previous iteration of step 228), then step 223 is repeated. Otherwise, at 240, it is determined if the current character is a vowel.

As the third function of the Algorithm 164, even steps 240–252 recursively perform a process, Pseudo-Phonetic String Reduction, on the word that results from the second general function (i.e., steps 220, 222, 223–225 and even steps 226–238). Table 6, below, shows an example of various Pseudo-Phonetic String Reductions, although a wide range of such reductions may be employed. For example, a Pseudo-Phonetic String Reduction Table may be moved from the table 7 of FIG. 1 to the Pseudo-Phonetic String Reduction Array 245 in memory. In turn, such Table and/or Array 245 may be adjusted in that memory (e.g., to add, delete or modify any or all of the Initial Sub-Strings, Replacement Sub-Strings and/or Conditions of Table 6).

If the character is a vowel, at 240, then at 242, Vowel_Key is set equal to Vowel_Key plus that vowel, after which step 223 is repeated. On the other hand, if the character is not a vowel, then steps 244 and 246 search the string for Initial Sub-Strings, in the order in which they are listed in the Array 245, and perform a replacement based on one of the corresponding Conditions. If it is determined that the string contains an Initial Sub-string as listed, at 244, and if the corresponding Condition for such sub-string is met, at 246, then the Initial Sub-String is replaced with the Replacement Sub-String at 248. Then, at 250, the character at Pos is obtained, after which, at 252, Main_Key is set equal to Main_Key plus that character (i.e., a consonant). Otherwise, if the test at 246 is not met, then step 252 is executed.

TABLE 6

| Initial Sub-String | Replacement Sub-String | Condition |
| --- | --- | --- |
| SION | TION | Always |
| SCH | SK | If the character following the H is a vowel or a "Y" |
| SCH | S | If the character following the H is not a vowel or not a "Y" |
| SC | SK | Always, unless one of the previous two Conditions is met |
| SH | S | If the character following the H is not a vowel or not a "Y" |
| PH | F | Always |
| CK | K | Always |
| G | J | If G is the first letter of the word and is followed by a vowel or a "Y" |
| J | H | If J is not the first letter of the word |
| H | | If H is not the first letter of the word and is not preceded by a vowel or a "Y", "T" or "C" |
| KN | N | If KN are the first two letters of the word and are followed by a vowel or a "Y" |

Steps 223–225 and even steps 226–252 are recursive, in that the word is checked against each sub-string listed in the Array 245. If any replacements are made, then such steps are repeated. Specifically, the software checks the word against all sub-strings in the Array 245 over and over again until an entire pass through the word does not result in any replacements.

For example, if the input word is "shinsky", the Algorithm 164 first looks for the sub-strings "SION", "SCH" and "SC" as set forth in the sample Table 6. Since none of these sub-strings is found in the input word, the Algorithm next looks for the substring "SH", which is found in the word. Since the character following the "H" is a vowel, specifically an "I", the condition is not met. Therefore, no replacement is made and the Algorithm 164 continues to look for the sub-strings "PH", "CK", "G", and "J". The Algorithm 164 does not find any of these sub-strings and, thus, looks for the sub-string "H", which is found in the string. Then, the corresponding Condition is checked. Since "H" is not the first letter of the word and is not preceded by a vowel or "Y", "T" or "C", it is replaced with the Replacement String. Since the Replacement string is empty (e.g., nothing, null, an empty string), the "H" is effectively deleted and is replaced with nothing. The word at this point would be "sinsky". Since a replacement was made during this pass through Table 6, steps 223–225 and even steps 226–252 are repeated for the remainder of the word and all sub-strings in Table 6 are again checked against the current string "sinsky". In this example, a second pass through Table 6 results in no substitutions and, therefore, the steps 223–225 and even steps 226–252 of the Algorithm 164 are completed.

A second example is the word "schnaubbelt", which the Algorithm 164, through step 238, transforms into "schnaubelt". Then, the first Initial Sub-String to match is "SCH" and since it is followed by a consonant, N, the word is transformed into "snaubelt". In this example, no other sub-strings in the word match, no additional replacement is made, and this step is complete, with the resulting word being "snaubelt".

Steps 242 and 252 of the Algorithm 164 output a string of vowels and a string of consonants, which are employed as the Vowel Key 243 and the Main Key 253, respectively. For example, "snaubelt" results in a Main Key 253 (Consonant Key) of "snblt" and a Vowel Key 243 of "aue". Once the Main Key 253 is separated from the Vowel Key 243, one additional step to the Consonant Key is performed based on one of the following conditions (even steps 254–258): (1) if the Main Key 253 is less than three characters in length, at 254, then nothing more is done to such Key and both the Main Key 253 (Consonant Key) and Vowel Key 243 are appended to the Key Table 18 at 262. On the other hand, if the Main Key 253 is greater than three characters in length, at 254, then the Alternate Key 255 is set equal to the Main Key 253, at 256, the third character is removed from the Alternate Key 255, at 258, and the Alternate Key 255 (modified Consonant Key) and Vowel Key 243 are appended to the Key Table 18 at 260. After step 262, the Algorithm 164 returns at 264.

The Algorithm 164 updates the Key Table 18 of FIG. 2 while adding new records or updating existing records. If a replacement word from the Replacement Word Table 22 is employed in building the Keys, then, by using Table 1 as an example, the following applies: if the Original Word does not match the Replacement Word, then an additional Key Table record (along with the one already inserted) is constructed and added to the Key Table 18 using the Original Word as the Replacement Word. For example, if "Snaubelt" were to be in the Replacement Word Table 22 (not shown in Table 4), then for "Snaubelt", three keys are created: (1) Consonant Key (Main Key)="snblt"; (2) Vowel Key="aue"; and (3) Alternate Key="snlt".

Figure 5:
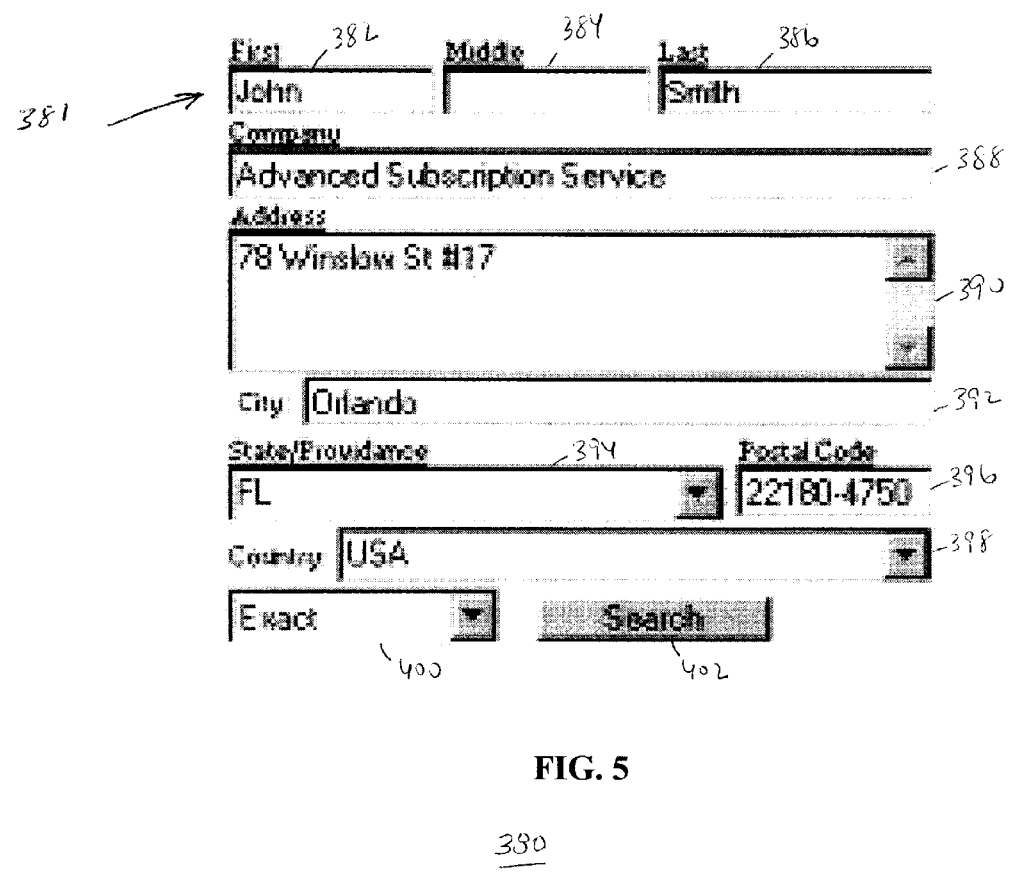

After the Key Table 18 has been populated by the preprocessing routine 16 of FIGS. 3A–3D, the search engine 4 of FIG. 1 performs searches against the database 6. During a search, a user enters information about any or all of the supported search fields. FIG. 5 shows an example of a GUI screen 380, which the user may employ for conducting searches against the database 6. In the exemplary embodiment, examples of these fields include: "Full Name" 381, "First Name" 382, "Middle Name" 384, "Last Name" 386, "Company" 388", "Address" 390, "PR Urbanization" (not shown), "City" 392, "State" 394, "Postal Code" 396, and "Country" 398. The GUI screen 380 enables the user to enter name and address (and/or company) information in any, some or all of the even fields 382–398, select the type of search (e.g., Exact) through the exemplary drop down entry field 400, and initiate the search through the "Search" button 402, which causes the search engine 4 to query the database 6 for names and addresses in response to the Search Criteria entered in the GUI screen 380.

After the user enters Search Criteria and clicks the "Search" button 402, the search engine 4 is invoked and the search is performed. The search result at step 70 of FIG. 2 is a set of records that match, or are suitably similar to, the data entered into the GUI screen 380.

Speed and accuracy are the primary objectives of any search engine. The techniques disclosed herein demonstrate high accuracy in terms of the records returned relative to the user's intent and also deliver the results with suitably high speed. Accuracy is obtained with the heuristics and reductions disclosed above, and speed is obtained with the database access ordering/search strategy, the Intelligent Conical Reduction Algorithm 154, as disclosed below in connection with FIGS. 4D–4F. The speed of a search is a direct result of accessing the database 6 with a strategy that constructs supersets of the result set at intermediate points and reduces these supersets in succession until the final result set is obtained. The insight of this technique is that the overall speed is dependent on the order in which the intermediate results are obtained. In this regard, the search elements of the Search Criteria are ordered based upon the relative expected size of the: corresponding search results from the database 6. In turn, the database is searched with one of those search elements, which is expected to provide a relatively smaller sized group of the search results, before searching the database 6 with another one of the search elements, which is expected to provide a relatively larger sized group of the search results.

The search engine 4 searches the database 6 for a variety of exact or near word matches across a number of database fields. Searching for these conditions, either manually or by relying on an advanced database engine, without any ordering of the criteria, may cause the intermediate results to be very large which would jeopardize the speed of the search. Therefore, the Intelligent Conical Reduction Algorithm 154 of FIG. 4D determines the order in which the various Search Criteria should be applied, in order to minimize, with some likelihood, the size of the intermediate result sets at each step of such Algorithm.

The Intelligent Conical Reduction Algorithm 154 orders all of the elements of the Search Criteria based on the likelihood that an individual element will produce a relatively small result set. Such elements of the Search Criteria that are expected to produce a small result set are applied early in the search and other such elements that are not likely to produce small result sets are applied later. This strategy will, with some degree of certainty, reduce the size of the intermediate result sets and increase the speed of the search.

For example, there may be a database search for an individual with first name of "John", last name of "Smith", and a specific word from address, say "McKernon". If the first Search Criterion or element to be applied is the first name of John, then the first intermediate result set is likely to be very large, since many "Johns" may exist in the database. If the second Search Criterion or element to be applied is the last name of Smith, then this second search would again produce a relatively large intermediate result set. Specifically, the second search is against a relatively large set and has a likelihood of returning a large subset of that set as the second result set. Applying the third and final Search Criterion or element of the word from the address to this set would reduce the set to the final result set, which would probably consist of one or a few records. If, alternatively, the most restrictive search is applied first (e.g., the word from the address), then the first intermediate result set is probably relatively small and all subsequent intermediate result sets are also small. Therefore, the search is faster.

The exemplary Intelligent Conical Reduction Algorithm 154 uses specific information about the Search Criteria, as entered, and general information about the data in the database to order each element of the Search Criteria based on its likelihood of producing small result sets. The approach is to list all elements of the Search Criteria, specifically each Word in the search criteria, in an array in internal (e.g., RAM) memory. This array is referred to as the Search Priority Key Array 309, an example of which is shown in Table 7, below. The Search Priority Key Array 309 has a similar structure to the Key Table 18 (Table 1), in that each Word in the Search Criteria is listed as a separate record in the array 309. There is, however, no column for Record Identifier in the Search Priority Key Array 309, and there are additional columns called "Field Sort Order", "Priority Constant", "Size Ordinal" and "Search Priority". The additional columns are designed to allow the records, or the Search Criteria elements, to be ordered so as to achieve, with some likelihood, fast search speed.

added to the Priority Constant for this word. This causes all words that are completely numeric to have a lower priority (i.e., a greater Priority Constant) than any of the non-numeric words. Fourth, as discussed in connection with steps 272,278,282,286 of FIG. 4D, for the following three fields: Name Field, Company Field, and Address Field, the words are grouped into sets according to their Priority Constant values.

Figure 4E:
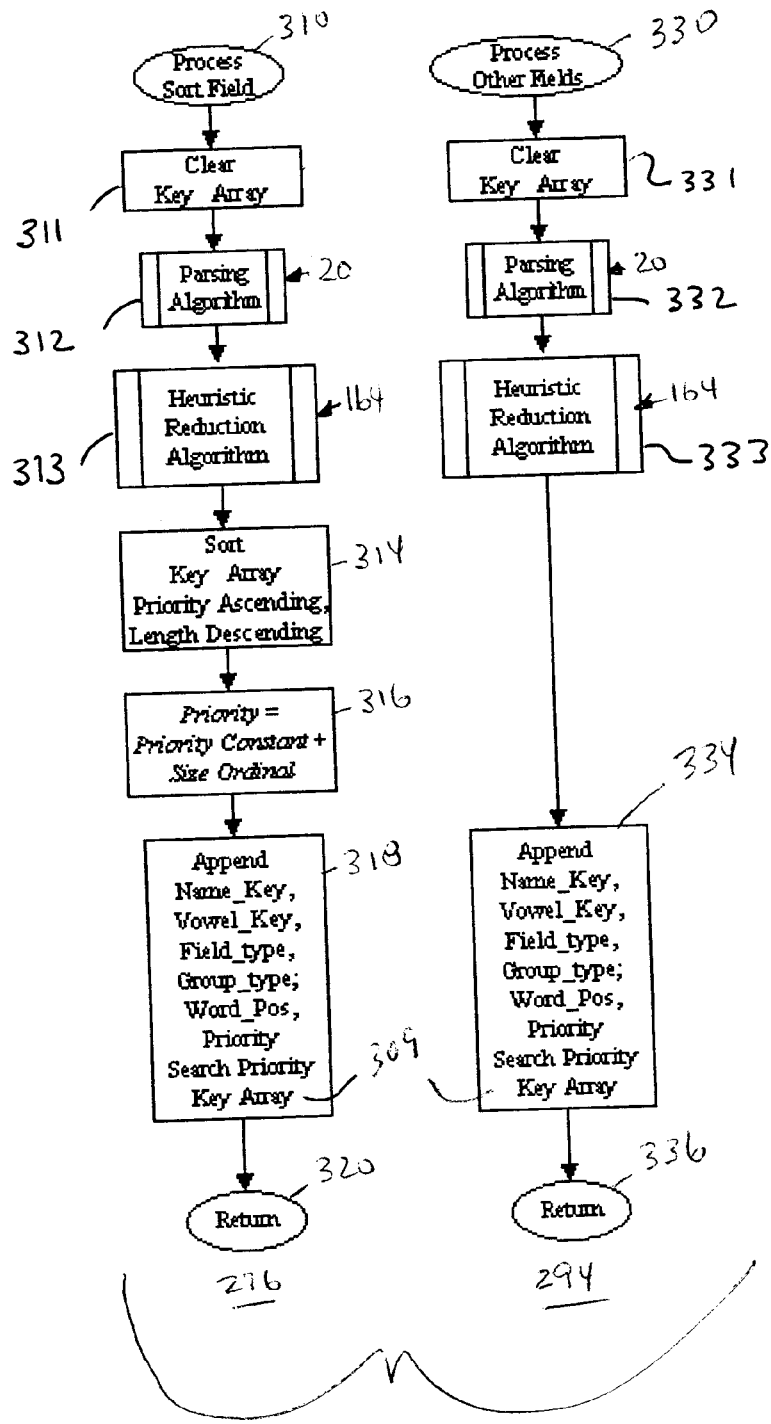
Figure 4F:
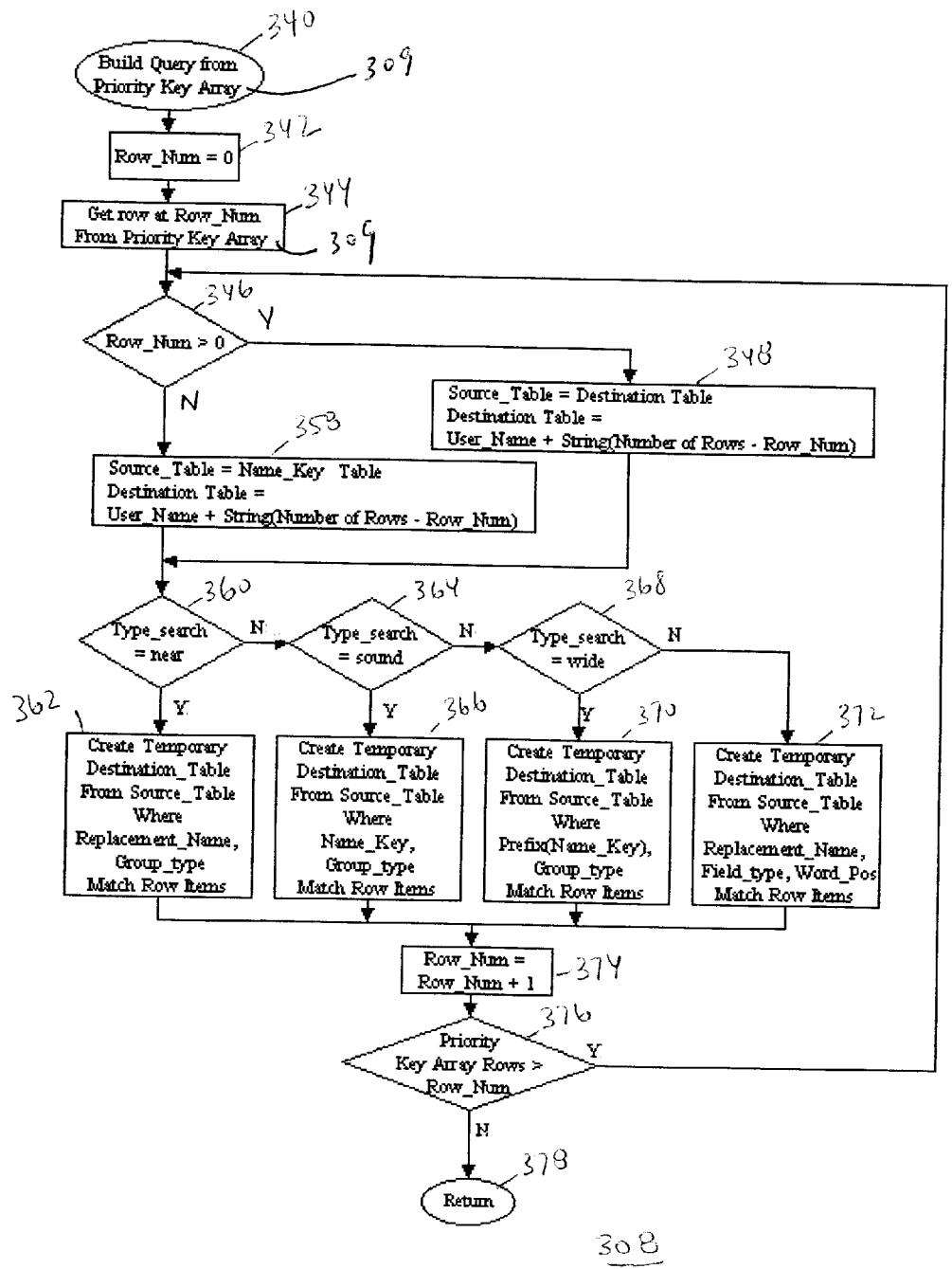

The Intelligent Conical Reduction Algorithm 154 begins at 270. If the Company Field is not empty at 272, then Group_Type is set to 1 and Field_Type is set to 2 at 274. Although FIG. 4D shows exemplary group and field types (e.g., as shown in Table 3), it is understood that these are example values and a wide range of other suitable values may be employed. Then, the Process Sort Field routine 276 of FIG. 4E is executed. On the other hand, if the Company Field was empty at 272 or after 276, it is determined if the Address Field is empty at 278. If it was not empty, then Group_Type is set to 2 and Field_Type is set to 3 at 280. Then, at 281, the Process Sort Field routine 276 is executed. On the other hand, if the Address Field was empty at 278 or after 281, it is determined if the Name Field is empty at 282. If it was not empty, then Group_Type is set to 1 and Field_Type is set to 1 at 284. Then, at 285, the Process Sort Field routine 276 is executed. On the other hand, if the Name Field was empty at 282 or after 285, the Search Priority Key Array 309 of FIG. 4F is sorted by ascending Priority (as set at step 316 of FIG. 4E) and descending word length at 286.

Next, at 290, it is determined if the City Field is empty at 290. If it was not empty, then Group_Type is set to 3 and

TABLE 7

| Field Type | Field Sort Order | Word Position | Original Word | Replacement Word | Consonant Key | Vowel Key | Priority Constant | Size Ordinal | Search Priority |
|---|---|---|---|---|---|---|---|---|---|
| 2 | 1 | 1 | International | International | NTRNTNL | IEAIOA | 1 | 0 | 1 |
| 2 | 1 | 2 | Association | Association | SCTN | AOIAIO | 1 | 1 | 2 |
| 2 | 1 | 3 | Of | of | F | O | 6 | 0 | 6 |
| 2 | 1 | 4 | Attorney | Attorney | TRN | AOEY | 1 | 2 | 3 |

FIGS. 4D and 4E show the steps employed by the Algorithm 154 to construct the Search Priority Key Array 309 in memory. The Search Priority Key Array 309 is populated with data entered by the user as the Search Criteria. Specifically, one record is placed into this array 309 for each Word of each field of the Search Criteria as entered (FIG. 5) by the user. Also, the Parsing Algorithm 20 (FIG. 4B) used in the search engine 4 is the same as the one used to populate the Key Table 18. For each Word obtained from the Parsing Algorithm 20, the first and the second through and including the seventh columns or fields of the Search Priority Key Array 309 are populated the same as they were in the population of the Key Table 18. Once these fields are populated, the Search Priority field for each record is obtained and the records are ordered as described below in connection with steps 314, 316 of FIG. 4E. Four general steps are employed. First, if the Replacement Word field was obtained from the Replacement Word Table 22 (Tables 4 and 8), then the Priority Constant is obtained from the Replacement Word Table 22 and is employed as the Priority Constant for this word. Otherwise, if the Original Word does not exist in the Replacement Word Table 22, then the Priority Constant for this word is set to zero. Third, if the Replacement Word is a string consisting of all digits, then "10" is Field_Type is set to 4 at 292. Then, at 294, the Process Other Fields routine 294 of FIG. 4E is executed. On the other hand, if the City Field was empty at 290 or after 294, it is determined if the State Field is empty at 296. If it was not empty, then Group_Type is set to 4 and Field_Type is set to 5 at 298. Then, at 299, the Process Other Fields routine 294 is executed. On the other hand, if the State Field was empty at 296 or after 299, it is determined if the Zip Code Field is empty at 300. If it was not empty, then Group_Type is set to 5 and Field_Type is set to 6 at 302. Then, at 303, the Process Other Fields routine 294 is executed. On the other hand, if the Zip Code Field was empty at 300 or after 303, it is determined if the Country Field is empty at 304. If it was not empty, then Group_Type is set to 6 and Field_Type is set to 7 at 306. Then, at 307, the Process Other Fields routine 294 is executed. On the other hand, if the Country Field was empty at 304 or after 307, the Build Query routine 308 of FIG. 4F is executed to build the query from the Search Priority Key Array 309.

For example, suppose the Company Name field is: "Association of International Attorneys". Table 8 shows the Replacement Words and Priority Constants for the words in this example string. The words in the Company Name are grouped into the following two sets: (1) {ASSOCIATION, INTERNATIONAL, ATTORNEYS}; and (2) {OF}, since the words in the first set have a Priority Constant of 1, and the word in the second set has a Priority Constant of 6. The Original Word "ATTORNEY" is obtained after the word "ATTORNEYS" was parsed.

TABLE 8

| Original Word | Replacement Word | Priority Constant |
|---|---|---|
| ASSOCIATION | ASSOCIATION | 1 |
| ATTORNEY | ATTORNEY | 1 |
| INTERNATIONAL | INTERNATIONAL | 1 |
| OF | OF | 6 |

The Process Sort Field routine 276 of FIG. 4E begins at 310, clears the Key Array (step 34 of FIG. 2) at 311, and executes the Parsing Algorithm 20 of FIG. 4B at 312. Next, at 313, the Heuristic Reduction Algorithm 164 of FIG. 4C is applied to these words to construct corresponding Consonant Keys. As an example, the Consonant Keys for these words and other entries in the Search Priority Key Array 309 are shown in Table 7. Next, the Key Array is sorted based upon ascending Priority (see Table 7) and descending word length at 314. At 316, Priority is set equal to Priority Constant plus the Size Ordinal (see Table 7). Then, at 318, the values: Name_Key, Vowel_Key, Field_Type, Group_Type; Word_Pos and Priority are appended to the Search Priority Key Array 309, before the routine 276 returns at 320.

At step 314 of FIG. 4E, the words in each of the two exemplary sets are replaced by the corresponding Consonant Keys. For example, INTERNATIONAL is replaced with NTRNTNL, ASSOCIATION is replaced with SCTN, ATTORNEY is replaced with TRN, and OF is replaced with F. Hence, the two sets become: (1) {SCTN, NTRNTNL, TRN}; and (2) {F}.

Also, at step 314, the words are ordered in each set by decreasing length. For example, the two sets in this example are reordered by decreasing word length, with the first set being changed to: {NTRNTNL, SCTN, TRN}, and the second set remaining unchanged, namely: {F}.

Further, at step 314, a Size Ordinal is assigned to each word as follows. For each one of the changed sets, the words are numbered from left to right starting with the number zero. Thus, the Size Ordinal of the words in the example above is: (1) {NTRNTNL=0, SCTN=1, TRN=2} for the first changed set; and (2) {F=0} for the second changed set.

At step 316, the Priority is calculated for each word as follows: Priority=Priority Constant (e.g., a user determined value)+Size Ordinal. The calculated priority is inserted into the Search Priority Key Array 309 as shown, for example, in Table 7.

The steps 330,331,332,333,334 of the Process Other Fields routine 294 are identical to the corresponding steps 310,311,312,313,318, respectively, of the Process Sort Field routine 276. The routine 294 does not include the steps 314 or 316.

At step 286 of FIG. 4D, after a Search Priority has been calculated for each record in the Search Priority Key Array 309 (Table 7), the entries are ordered in this array so as to produce efficient database queries. The strategy is to sort the records in the Search Priority Key Array 309 by the following three fields: (1) Priority (ascending); (2) Field Sort Order (ascending); and (3) Word Length (descending), respectively. An example of the way the Search Priority Key Array 309 looks after the sorting algorithm is applied is shown in Table 9, which shows a portion of a sorted Search Priority Key Array.

TABLE 9

| Field Type | Field Sort Order | Word Position | Original Word | Replacement Word | Consonant Key | Vowel Key | Priority Constant | Size Ordinal | Search Priority |
|---|---|---|---|---|---|---|---|---|---|
| 2 | 1 | 1 | International | International | NTRNTNL | IEAIOA | 1 | 0 | 1 |
| 2 | 1 | 2 | Association | Association | SCTN | AOIAIO | 1 | 1 | 2 |
| 2 | 1 | 4 | Attorney | Attorney | TRN | AOEY | 1 | 2 | 3 |
| 2 | 1 | 3 | Of | Of | F | O | 6 | 0 | 6 |

The sorting algorithm 286 first sorts the entries in the Search Priority Key Array 309 by the Search Priority field. Then, within any groups of items that have the same Search Priority, the items are sorted by Field Sort Order. Then, within any groups of items that have the same Search Priority and the same Field Sort Order, the items are sorted by decreasing Word Length.

Table 10 shows another example depicting the order of some of the entries in the Search Priority Key Array 309 after sorting. The "Search Priority" field is the most significant sorting field, the "Field Sort Order" is the next highest sorting field, and "Word Length" is the least significant sorting field.

TABLE 10

| Item | Search Priority | Field Sort Order | Word Length |
|---|---|---|---|
| Item 1 | 0 | 3 | 5 |
| Item 2 | 0 | 3 | 4 |
| Item 3 | 0 | 4 | 5 |
| Item 4 | 1 | 1 | 4 |
| Item 5 | 1 | 1 | 3 |
| Item 6 | 1 | 2 | 8 |
| Item 7 | 2 | 1 | 3 |
| Item 8 | 2 | 3 | 5 |
| Item 9 | 2 | 3 | 3 |

Next, as discussed in connection with steps 290,296,300, 304,306 of FIG. 4D, after the items in the Search Priority Key Array 309 have been sorted, at 286, the words from the remaining fields: City, State, Zip Code and Country are appended, in the order listed, to the Search Priority Key Array 309 as the last records in such Array.

Once the Search Priority Key Array 309 is constructed and sorted as described above, conducting the search is straightforward as discussed in connection with routine 308 of FIG. 4F. The Search Criterion record, which is listed first in the Search Priority Key Array 309, is applied against the database 6 of FIG. 1 and an intermediate result set is obtained, at 358. If a second Search Criterion record is listed in the Search Priority Key Array 309, it is applied to the intermediate result set and a second intermediate result set is constructed at 348. If a third Search Criterion record is present in the Search Priority Key Array 309, then it too is applied against the most-recent intermediate result set at the next iteration of 348. This process is continued until all records in the Search Priority Key Array 309 have been applied. Since the Search Criteria are applied in the order described, relatively small intermediate result sets and a relatively fast search are provided.

The Build Query routine 308 of FIG. 4F starts at 340. At 342, the variable Row_Num is set equal to zero. Next, at 344, the row at Row_Num is obtained from the Search Priority Key Array 309. At 346, if the Row_Num is greater than zero, then, at 348, the Source_Table is set equal to the Destination Table, and the Destination Table is set equal to the User_Name plus String(Number of Rows—Row_Num). On the other hand, if the Row_Num is not greater than zero, then, at 358, the Source_Table is set equal to the Name_Key Table, and the Destination Table is set equal to the User_Name plus String(Number of Rows—Row_Num). For example, the row number (Row_Num) starts at 0, using a zero based array. If there is only one row in the Key Array, then the Name Key Table for that value is queried and the results are placed into a temporary table named for a username (e.g., "Keith")+"0"="Keith0". Then, those results are employed to query the names/addresses table 42 using the Record Identifier in both tables, "Keith0" and "Names and Address", respectively. If there are more than one row in the Key Array (e.g., three for this example), then the Name Key Table is queried against the values in the first row and the values in the second row and those results are put into a temporary table for user name "Keith"+(number of rows 3—row number 2)="Keith1". Then, it is determined that Row_Num is now zero and the Name Key Table is queried against the results from the "Keith 1" temporary table along with the values in row number 0. Those results are placed into a temporary table named "Keith0". Hence, regardless of the initial count of rows, the final query is against the temporary table that ends in 0 (Keith0) and the names/addresses table 42.

After either of steps 348 and 358, even steps 360–372 describe four exemplary types of searches: (1) "Exact Search" (step 372 if all of the tests fail at steps 360,364,368); (2) "Near Search" (step 362 as selected by the test at step 360); (3) "Pseudo-Phonetic Search" (step 366 as selected by the test at step 364); and (4) "Wide Pseudo-Phonetic Search" (step 370 as selected by the test at step 368). The selection of one of those searches is determined by the drop down entry field 400 (e.g., "Exact") of FIG. 5.

Steps 362,366,370,372 create the Temporary Destination_Table from the Source_Table under different scenarios as discussed below. After those steps, the Row_Num is incremented at 374. Then, at 376, it is determined if the count of rows in the Search Priority Key Array 309 is greater than Row_Num. If so, then step 346 is repeated. Otherwise, the routine 308 returns at 378.

As employed herein, a Exact Search at step 372 is defined to be a search of the database 6 that produces a resulting record set of database records such that all records in the result set match the Search Criteria exactly across the following four fields: (1) Field Type; (2) Word Position; (3) Replacement Word; and (4) Consonant Key. The Search Criteria words are matched only against words in the Key Table 18 that have been obtained from an identical Field Type and Word Position. For example, searching for the last name of "Dawson" matches entries such as "Susan Dawson" or "Desmond Dawson", but does not match entries such as "Dawson Smith" because the search criterion is searching for Dawson as a last name, not as a first name or middle name. Additionally, if the Search Criteria searches for "Dawson" as last name and "Electric" as company name (first word position), then the search matches entries such as "Susan Dawson" with a company name of "Electric Designs" because both the Word Positions and Field Types of the Search Criteria match the Word Positions and Field Types of the record of the database 6. However, the search does not find a match between the above Search Criteria and the database record having name "Susan Dawson" and company "Dawson Electric". This is because the word "Electric" has a Word Position of "1" in the Search Criteria, but has a Word Position of "2" in the phrase "Dawson Electric".

As another example, consider the Search Criteria of "Dawson" as last name and "12 Main" as an address. This search matches entries such as "Susan Dawson" with address "12 Main Street" because both Word Positions and Field Types match for all three words: "Dawson", "12" and "Main". However, this search would not find "Susan Dawson" at address "12 North Main" since the word "Main" has a Word Position of "2" in the Search Criteria and has a Word Position of "3" in the database record.

Finally, the Search Criteria having "Bill Dawson" as a name matches database records having "William Dawson" as the name, since "William" matches "Bill" in the Replacement Word Array (e.g., see Table 4, which shows the corresponding Replacement Word Table 22).

As employed herein, a Near Search at step 362 is defined to be a search of the database 6 that produces a resulting record set of database records such that all records in the result set match the Search Criteria exactly across the following three fields: (1) Replacement Word; (2) Consonant Key; and (3) Group Number (as shown in Table 3). In this search, Field Types of "1" and "2", Name and Company, respectively, are allowed to match each other since they both have Group Number "1". All other Field Types must match exactly.

When the user conducts a "Near Search," the Search Criteria words are matched only against words in the Key Table 18 that have been obtained from identical Group Numbers. For example, searching for the last name of "Dawson" matches entries such as "Susan Dawson" or "Dawson Smith" because the Search Criterion is searching for Dawson as a last name and the Near Search, unlike the Exact Search, allows matching across Word Positions. This example Search Criterion also matches entries such as "Dawson Electric" since the Near Search matches a word against words with the same Group Number. Again, as is shown by Table 3, above, both the Name Field and the Company Field have the Group Number of "1". Therefore, the "Dawson" in the Name Field of the Search Criteria matches the "Dawson" in the Company Field of the database record, with the Word Position being ignored for this type of search.

As another example, for the Search Criteria of "Dawson" as last name and "12 Main" as an address, this search matches entries such as "Susan Dawson" with address "12 Main Street" and "Susan Dawson" at address "12 North Main" since the Word Position is ignored.

As a further example, for the Search Criteria of "Bill Dawson" as a name, this search matches database records having "William Chen" as the name and "Dawson Electronics" as the company, but does not match "William Chen" with a company name of "Electric Designs" and an address of "12 Dawson Street". This is because the Name Field and the Address Field do not have the same Group Number.

As employed herein, a Pseudo-Phonetic Search at step 366 is defined to be a search of the database 6 that produces a resulting record set of database records such that all records in the result set match the Search Criterion exactly across the following two fields: (1) Consonant Key; and (2) Group Number (as shown in Table 3). Again, Field Types of "1" and "2", Name and Company, respectively, are allowed to match each other since they both have Group Number "1". All other Field Types must match exactly. The Pseudo-Phonetic Search is identical to the Near Search, except that the Replacement Word is ignored in the former search. This produces a result set that is a superset of the result set produced by a Near Search with the same Search Criteria. For example, where Robert Smith was returned in the Near Search, the Pseudo-Phonetic Search would return Robert Smith, but could also return Robert Smooth.

For example, for the Search Criterion having the last name of "Dawson", this matches entries such as "Susan Dawson" or "Dawson Smith" because the Search Criterion is searching for Dawson as a last name. Furthermore, additional database records could also be returned such as, for example, "Dewsean Advertising" since both "Dawson" and "Dewsean" have the same Consonant Key, which is "dwn" (i.e., "dwsn" less the third consonant "s").

For the Pseudo-Phonetic Search in which the search key (e.g., Name Key) for the Search Criterion has an exact count of "3" consonants in length, then the searching is done by retrieving database records that match the consonants in such Name Key and the resulting database records must have a count of exactly three consonants. For example, for "Dawson", since there are two keys created, "dwsn" (Consonant Key) and "dwn" (Alternate Key), there is a search of the Name Keys for Name Key="dwsn" or Name Key="dwn". One key has a consonant length of 3 and the other key has a consonant length of 4.

As employed herein, a Wide Pseudo-Phonetic Search at step 370 is defined to be a search of the database 6 that produces a resulting record set of database records such that all records in the result set have: (1) a Consonant Key that contains the Consonant Key of the word in the Search Criteria as a prefix; and (2) Group Number (as shown in Table 3). Again, Field Types of "1" and "2", Name and Company, respectively, are allowed to match each other since they both have Group Number "1". The Wide Pseudo-Phonetic Search is identical to the Pseudo-Phonetic Search except that the prefix part of the Consonant Key in the database records matches the Consonant Key of the Search Criteria.

The Field Type Table of Table 3, above, has a column titled "Group Number". This column allows the assignment of a Group Number to multiple field types. For example, the various Name fields and the Company field each have a Group Number of "1", whereas the other entries in Table 3 are assigned different group numbers. The Field Type Group Numbers are applied differently for the various searches that can be conducted.

For example, the word "Smithson" in a database record will not match the word "Smith" as the Search Criterion in the Pseudo-Phonetic Search because the two words have different Consonant Keys: "SMTHSN" and "SMTH" respectively. (There are also two different Alternate Keys: "SMHSN" and "SMH", respectively.) On the other hand, these words match under the Wide Pseudo-Phonetic Search since the Consonant Key "SMTH" is a prefix of the Consonant Key "SMTHSN". Similarly, under the Wide Pseudo-Phonetic Search, a search criterion of "Smithson" will not match database records containing the word "Smith" since "SMTHSN" is not a prefix of "SMTH". This produces a result set that is a superset meaning that the Pseudo-Phonetic Search would return "Smith", while the Wide Pseudo-Phonetic Search would return "Smith", but could also return "Smithson" if Smithson were in the database.

Figure 6:
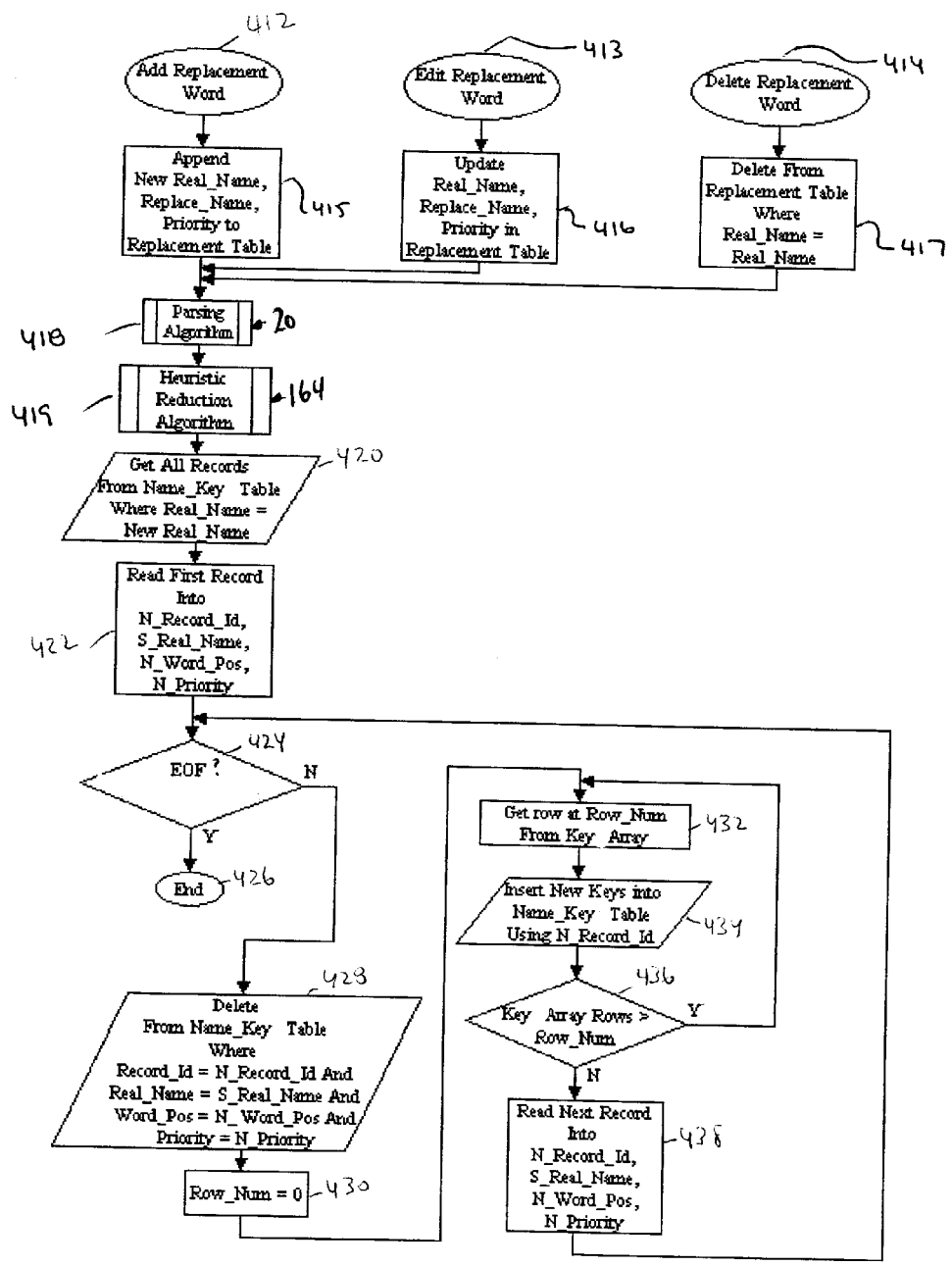
FIG. 6 is a flowchart of a routine for adding, editing or deleting replacement words in the replacement word table and updating of the key table of FIG. 2.

FIG. 6 shows a routine 410 for adding, editing or deleting Replacement Words in the Replacement Word Table 22 and updating of the Key Table 18 of FIG. 2. The routine 410 has three entry points 412,413,414 based upon whether Replacement Words are to be added, edited or deleted, respectively. At 415, after 412, the new Real_Name, Replace_Name, and Priority are appended as Original Word, Replacement Word and Priority Constant values, respectively, of the Replacement Word Table 22. At 416, after 413, the Real_Name, Replace_Name, and Priority are updated in the corresponding Original Word, Replacement Word and Priority Constant values, respectively, in the Replacement Word Table 22. At 417, after 414, the corresponding values are deleted from the Replacement Word Table 22, where the Real_Name in the request matches the Real_Name (Original Word) in the Table 22.

After 415, 416 or 417, at 418 and 419, the Parsing Algorithm 20 of FIG. 4B and the Heuristic Reduction Algorithm 164 of FIG. 4C are respectively executed. Next, at 420, all records are obtained from the Name Key Table 18 of FIG. 2, where the Real_Name of that Table is equal to the Old Real_Name of the request. Then, at 422, the first record from step 420 is read into the variables N_Record_Id, S_Real_Name, N_Word_Pos, and N_Priority. At 424, it is determined if there were no further records (in this first instance, there may have been no records at 420). If so, then the routine 410 ends at 426. Otherwise, at 428, the record of the Name_Key Table is deleted where the Record_Id is equal to N_Record_ld, and the Real_Name is equal to S_Real_Name, and the Word_Pos is equal to N_Word_Pos, and the Priority is equal to N_Priority. At 430, the variable Row_Num is set to zero and, at 432, the row at Row_Num is obtained from the Key Array (e.g., from steps 260,262 of FIG. 4C).

Next, at 434, the New Keys from the Heuristic Reduction Algorithm 164 are inserted into the Name_Key Table using N_Record_Id. At 436, if the count of Rows of the Key Array is greater than the Row_Num, then step 432 is repeated. Otherwise, at 438, the next record from step 420 is read into the variables N_Record_ld, S_Real_Name, N_Word_Pos, and N_Priority before step 424 is executed.

FIG. 7 shows the Results Ordering Algorithm 156, which is executed for each of the records of the Result Set. Once the search engine 4 of FIG. 1 returns the Result Set of records which match the Search Criteria, each record in the Result Set is assigned a Score. The Score indicates the degree to which each record matches the Search Criteria. Records are then preferably presented to the user in order of decreasing score. This approach enables the user to view the "best" records first, then proceed down the list through the records that do not appear to be the "best" until the record(s) of interest are found. Initially, all records begin with an initial score of zero.

The Algorithm 156 begins at 450 after which a field, ORD, is appended to a Temporary Destination_Table 451 at 452. The initial value of this field ORD is set to zero. Next, at 454, the variable Row_Num is set to zero and, at 456, the row at Row_Num is obtained from the Search Priority Key Array 309 (FIG. 4D). If Group_Type(Row_Num) of the Array 309 is equal to one at 458 and if Field_Type(Row_Num) is equal to one at 459, then a first set of corresponding constants (AddOrd1=10, AddOrd2=100, AddOrd3=1000) for the Name Fields is initialized at 460. On the other hand, if the Field_Type(Row_Num) is not one at 459, then a second set of corresponding constants (AddOrd1=10000, AddOrd2=100000, AddOrd3=1000000) for the Company Field is initialized at 461.

Otherwise, if Group_Type(Row_Num) of the Array 309 is not one at 458 and if Group_Type(Row_Num) is equal to two at 462, then a third set of corresponding constants (AddOrd1=0, AddOrd2=10000000, AddOrd3=100000000) for the Address Field is initialized at 463. On the other hand, if the Group_Type(Row_Num) is not two at 462, then a fourth set of corresponding constants (AddOrd1=0, AddOrd2=1, AddOrd3=1) for all other Fields (e.g., City, State, Zip Code, Country) is initialized at 464.

The exemplary weighting factors generally favor those search results for the Address field over the Company field, the Company field over the Name Field, and the Name Field over all the other fields. This is true, except for step 472, which favors the Company field over the Name Field, and the Name field over all the other fields.

Even steps 472–484 update each record in the Temporary Destination_Table and adjust the corresponding values of ORD where a defined portion of the Search Criteria matches a corresponding defined portion of the particular Row_Num of the Search Priority Key Array 309. Step 472 is executed after steps 460 or 461. Step 474 is executed after steps 463, 464 or 472.

At 472, the value of ORD is incremented by the value of AddOrd1 where the Replacement_Name and the Group_Type of the Search Criteria matches the corresponding portion (i.e., Replacement Word and Group Type, which is defined by the Field Type) of the Row_Num of the Search Priority Key Array 309.

At 474, the value of ORD is incremented by the value of AddOrd2 where the Replacement_Name and the Field_Type of the Search Criteria matches the corresponding portion (i.e., Replacement Word and Field Type) of the Row_Num of the Search Priority Key Array 309.

At 476, the value of ORD is incremented by the value of AddOrd2 where the Replacement_Name, Field_Type and Word_Pos of the Search Criteria matches the corresponding portion (i.e., Replacement Word, Field Type and Word Position) of the Row_Num of the Search Priority Key Array 309.

At 478, the value of ORD is incremented by the value of AddOrd3 where the Real_Name and Field_Type of the Search Criteria matches the corresponding portion (i.e., Original Word and Field Type) of the Row_Num of the Search Priority Key Array 309.

At 480, the value of ORD is incremented by the value of AddOrd3 where the Prefix(Real_Name) and Group_Type of the Search Criteria matches the corresponding portion (i.e., Prefix(Original Word) and Group Type, which is defined by the Field Type) of the Row_Num of the Search Priority Key Array 309.

At 482, the value of ORD is incremented by one where: (i) the Prefix(Name_Key) and Field_Type of the Search Criteria matches the corresponding portion (i.e., Prefix (Consonant Key) and Field Type) of the Row_Num of the Search Priority Key Array 309; and (ii) the first character of the Vowel_Key of the Search Criteria matches the corresponding portion (i.e., the first character of the Vowel_Key (Row_Num)) at the Row_Num of the Search Priority Key Array 309.

At 484, the value of ORD is incremented by one where: (i) the Prefix(Replacement_Name) and Field_Type of the Search Criteria matches the corresponding portion (i.e., Prefix (Replacement Word) and Field Type) of the Row_Num of the Search Priority Key Array 309; and (ii) the first character of the Vowel_Key of the Search Criteria matches the corresponding portion (i.e., the first character of the Vowel_Key(Row_Num)) at the Row_Num of the Search Priority Key Array 309.

After step 484, the Row_Num is incremented at 486. At 488, if the count of Rows of the Search Priority Key Array 309 is greater than the Row_Num, then step 456 is repeated. Otherwise, the Algorithm 156 returns at 490.

Table 11 shows an example of the final scoring of the search results for a set of Search Criteria over Name, Company and Address fields. The left-most column contains the example Search Criteria. The next column presents the information from the records of the database 6 of FIG. 1. The next three columns contain individual score components: Name Score, Company Score and Address Score. The final column sums the Name, Company and Address scores to produce the overall score. This represents the corresponding value of ORD after step 484 for the corresponding record of the Temporary Destination_Table.

TABLE 11

| Search Criteria<br>Name Field<br>Company Field<br>Address Field | Matching Record<br>Name Fields<br>(First, M., Last)<br>Company Field<br>Address Field | Name<br>Score | Company<br>Score | Address<br>Score | Total<br>Score |
|---|---|---|---|---|---|
| William Walter Smith<br>Poolesville Corp<br>112 Brad Ave | William Walter Smith<br>Poolesville-Smith Corporation<br>112 Brad Ave | 7640 | 3320000 | 660000000 | 663327640 |
| William Walter Smith<br>Poolesville Corp<br>112 Brad Ave | William Walter Smith<br>Poolesville Corporation<br>112 Bradford Ave | 6630 | 3420000 | 560000000 | 563426630 |
| William Walter Smith<br>Poolesville Corp<br>112 Brad Ave | Bill Walter Smith<br>Poolesville-Smith Corporation<br>112 Bradford Heights Ave | 5640 | 3320000 | 550000000 | 553325640 |

TABLE 11-continued

| Search Criteria<br>Name Field<br>Company Field<br>Address Field | Matching Record<br>Name Fields<br>(First, M., Last)<br>Company Field<br>Address Field | Name<br>Score | Company<br>Score | Address<br>Score | Total<br>Score |
|---|---|---|---|---|---|
| William Walter<br>Smith<br>Poolesville Corp<br>112 Brad Ave | Bill Walter Smyth<br>Poolesville-Smyth Corporation<br>112 Bradford Avenue | 2640 | 3320000 | 460000000 | 463322640 |
| William Walter<br>Smith<br>Poolesville Corp<br>112 Brad Ave | Walter Bill Smyth<br>Poolesville-Smyth Corporation<br>112 West Bradford Avenue | 2440 | 3320000 | 440000000 | 443322440 |

Although the Address Score is weighted relatively higher than the Company Score, which is weighted relatively higher than the Name Score, the method and apparatus of the invention may employ a wide range of weighting factors having different sets of constants and having different relative weights.

The method and search engine 4 disclosed herein perform relatively fast, domain-cognizant searches against the database 6. The method includes the pre-processing routine 16, which obtains statistical insight into the structure of the database 6 and the nature of the data present and which employs this information in the search strategy to make each step in the search as fast as possible, based on the statistics obtained. The method includes a strategy for efficiently maintaining domain-specific knowledge, separate from the search algorithm itself, and to have the pre-processing results track with changes to both the domain-specific knowledge and also the data in the database 6 on an incremental basis. This eliminates the need to repeat pre-processing after changes to the knowledge base or to the database 6. The method and search engine 4 may be configured to access an existing database or a database, which is completely dedicated to such search engine.

It is believed that the exemplary search engine 4 provides significant improvements in accessing a database, such as a name and address database. For example, with a single 450 MHz processor having 64 Mb of memory, and with a name and address database having 4.1 million records, each of which has some sort of duplication from other records, search results including about 16 to about 48 records are returned in about 16 to about 22 seconds.

Although for convenience of disclosure reference is made herein to various arrays and tables, it will be appreciated that such structures may be employed in memory and/or in disk storage and/or in any suitable storage area.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method for searching a database including a plurality of records, at least some of said records having a plurality of record fields and a plurality of record elements, said method comprising:

receiving a search criteria including a plurality of search elements corresponding to at least some of the record elements of said database, each of said search elements being capable of returning one or more corresponding search results from the records of said database;

ordering the search elements of said search criteria based upon an expected size of the corresponding search results from said database; and searching said database with one of said search elements, which is expected to provide a first group of said search results, before searching said database with another one of said search elements, which is expected to provide a second group of said search results, said second group being larger in size than said first group.

2. The method of claim 1 further comprising employing at least two of said search elements.

3. The method of claim 1 further comprising employing a first one of said search elements, which is expected to provide said first group of said search results;

employing a second one of said search elements, which is expected to provide said second group of said search results;

employing a third one of said search elements, which is expected to provide a third group of said search results, said third group being larger in size than said second group; and sequentially searching said database with said first one, said second one, and said third one of said search elements, respectively.

4. The method of claim 1 further comprising constructing a search priority array including a plurality of records, each of said records of said search priority array having a plurality of fields;

employing a search priority field as one of the fields of said records of said search priority array; and calculating the search priority field for each of said records of said search priority array.

5. The method of claim 4 further comprising employing an array of replacement words including a plurality of records;

employing with each of the records of said array of replacement words an original word, a replacement word and a priority constant; and for at least some of the search elements of said search criteria, determining if one of said at least some of the search elements corresponds to one of the replacement words of said array of replacement words and responsively employing a corresponding one of the priority constants of said array of replacement words in said step of ordering the search elements of said search criteria.

6. The method of claim 5 further comprising for at least some of the search elements of said search criteria, determining if one of said at least some of the search elements does not correspond to any of the replacement words of said array of replacement words and responsively employing a predetermined priority constant in said step of ordering the search elements of said search criteria.

7. The method of claim 6 further comprising employing zero as said predetermined priority constant.

8. The method of claim 5 further comprising for at least some of the search elements of said search criteria, determining if one of said at least some of the search elements is a string of a plurality of digits and responsively adding a predetermined priority constant to the corresponding one of the priority constants of said array of replacement words in said step of ordering the search elements of said search criteria.

9. The method of claim 8 further comprising employing ten as said predetermined priority constant.

10. The method of claim 5 further comprising employing with each of the records of said search priority array a plurality of fields including a replacement word field, a consonant key field, a priority constant field, a size ordinal field and a search priority field;

populating at least some of the replacement word fields and the priority constant fields of said search priority array with corresponding pairs of the replacement words and priority constants, respectively, from said array of replacement words;

calculating the consonant key field including at least one consonant for each of said replacement word fields;

for each unique value of the priority constant fields, assigning a first size ordinal value to the size ordinal field which corresponds to the constant key field having a largest count of said at least one constant, and assigning progressively larger size ordinal values to the other size ordinal fields which have progressively smaller counts of said at least one constant; and calculating each of the search priority fields from the sum of the corresponding priority constant field and the corresponding size ordinal field.

11. The method of claim 10 further comprising employing zero as the first size ordinal value.

12. The method of claim 11 further comprising employing one as a second size ordinal value for at least one of the size ordinal fields which has a second largest count of said at least one constant.

13. The method of claim 10 further comprising receiving said search criteria including a plurality of search fields each of which includes at least one of said search elements;

further employing with each of the records of said search priority array a sort order field for each of said search fields;

ordering said search elements of said search criteria based upon progressively larger values of the corresponding search priority field; and for each of said search elements having identical values of the corresponding search priority field, further ordering said search elements having identical values based upon progressively larger values of the corresponding sort order fields.

14. The method of claim 13 further comprising for each of said search elements having identical values of the corresponding search priority field and identical values of the corresponding sort order field, further ordering said search elements having the last said identical values based upon progressively smaller sizes of the corresponding consonant key field.

15. The method of claim 13 further comprising employing as said record fields a company field, a name field, an address field and a city field.

16. The method of claim 15 further comprising employing as the record elements of said name field a full name element, a first name element, a middle name element and a last name element.

17. The method of claim 15 further comprising assigning progressively larger values to the sort order fields for each of said search fields corresponding to the company field, the address field, the city field and the name field, respectively.

18. The method of claim 17 further comprising further employing as said record fields a state field, a zip code field and a country field;

receiving said search criteria including a plurality of other search fields corresponding to said state field, said zip code field and said country field;

progressively ordering said other search fields after all of the search elements corresponding to the company field, the address field, the city field and the name field based upon said state field, said zip code field, and said country field, respectively; and progressively searching said database with said other search fields.

19. The method of claim 5 further comprising employing with said search criteria a name field including a plurality of words corresponding to one of the record fields of said database;

employing a plurality of field type values, each of which corresponds to one of the record fields of said database;

employing a plurality of word position values, each of which corresponds to one of the words of said name field;

employing with each of the records of said search priority array a plurality of fields including a field type field, a replacement word field, a consonant key field and a word position field;

populating each of the field type fields with a corresponding one of the field type values;

populating at least some of the replacement word fields with corresponding replacement words from said array of replacement words;

calculating the consonant key fields including at least one consonant from a corresponding one of said replacement word fields;

populating each of the word position fields with a corresponding one of the word position values; and providing one of said search results which exactly matches said field type field, said replacement word field, said consonant key field and said word position field.

20. The method of claim 5 further comprising employing a plurality of group number values, each of which corresponds to at least one of the record fields of said database;

employing with each of the records of said search priority array a plurality of fields including a group number field, a replacement word field and a consonant key field;

populating each of the group number fields with a corresponding one of the group number values;
populating at least some of the replacement word fields with corresponding replacement words from said array of replacement words;
calculating the consonant key fields including at least one consonant from a corresponding one of said replacement word fields; and
providing one of said search results which exactly matches said group number field, said replacement word field and said consonant key field.

21. The method of claim 5 further comprising
employing a plurality of group number values, each of which corresponds to at least one of the record fields of said database;
employing with each of the records of said search priority array a plurality of fields including a group number field, a replacement word field and a consonant key field;
populating each of the group number fields with a corresponding one of the group number values;
calculating the consonant key fields including at least one consonant from a corresponding one of said replacement word fields; and
providing one of said search results which exactly matches said group number field and said consonant key field.

22. The method of claim 21 further comprising
employing as said search criteria a search word having a count of three consonants; and
providing one of said search results which exactly matches said group number field and a first two of said three consonants, and which has a count of three consonants.

23. The method of claim 5 further comprising
employing a plurality of group number values, each of which corresponds to at least one of the record fields of said database;
employing with each of the records of said search priority array a plurality of fields including a group number field and a consonant key field;
populating each of the group number fields with a corresponding one of the group number values;
calculating the consonant key fields including at least one consonant from a corresponding one of said replacement word fields;
employing as said search criteria a plurality of search words; and
providing one of said search results which exactly matches said group number field and a prefix of said consonant key field.

24. The method of claim 4 further comprising
producing a plurality of output records from said database as said search results; and
producing a plurality of scores associated with said output records, each of said scores representing a degree of match between one of said output records and said search criteria.

25. The method of claim 24 further comprising
employing with each of the records of said search priority array a plurality of fields including a field type field having a plurality of values;
associating each of the search elements of said search criteria with one of the values of said field type field;
producing said scores from a plurality of sets of weighting factors; and
for each of the search elements, assigning one of said sets of weighting factors based upon said one of the values of said field type field.

26. The method of claim 25 further comprising
employing with each of the records of said search priority array a plurality of fields including a replacement word field and a field type field;
employing with said one of said sets of weighting factors a first weighting factor; and
for each of the search elements, receiving said replacement word field and said field type field from said search priority array, and for each of the output records, determining if said replacement word field matches one of the record elements of at least one of the record fields which corresponds to said field type field of said search element, and responsively increasing the score of said output record with said first weighting factor.

27. The method of claim 26 further comprising
employing as said field type field a name field;
employing as said at least one of the record fields of said output records a name field and an address field; and
associating the name and address fields of said output records with said name field of said search element.

28. The method of claim 26 further comprising
employing with said one of said sets of weighting factors a second weighting factor; and
for each of the search elements and for each of the output records, determining if said replacement word field matches one of the record elements of one of the record fields which corresponds to said field type field of said search element, and responsively increasing the score of said output record with said second weighting factor.

29. The method of claim 28 further comprising
employing said second weighting factor, which is greater than said first weighting factor.

30. The method of claim 28 further comprising
employing as said field type field a name field; and
employing as said one of the record fields of said output records a name field.

31. The method of claim 28 further comprising
further employing with each of the records of said search priority array a word position field; and
for each of the search elements, receiving said word position field from said search priority array, and for each of the output records, determining if said replacement word field matches one of the record elements of one of the record fields which corresponds to said field type field and said word position field of said search element, and responsively increasing the score of said output record with said second weighting factor.

32. The method of claim 28 further comprising
further employing with each of the records of said search priority array an original word field;
employing with said one of said sets of weighting factors a third weighting factor; and
for each of the search elements and for each of the output records, determining if said original word field matches one of the record elements of one of the record fields which corresponds to said field type field of said search element, and responsively increasing the score of said output record with said third weighting factor.

33. The method of claim 32 further comprising employing said third weighting factor, which is greater than said second weighting factor.

34. The method of claim 25 further comprising employing a name field, a company field and an address field as some of the fields of said search priority array; and employing as said sets of weighting factors a first set of constants associated with the name field, a second set of constants associated with the company field, and a third set of constants associated with the address field.

35. The method of claim 34 further comprising weighting said second set of constants greater than said first set of constants; and weighting said third set of constants greater than said second set of constants.

36. The method of claim 34 further comprising employing a city field, a state field, a zip code field and a country field as some of the fields of said search priority array; and further employing as said sets of weighting factors a fourth set of constants associated with said city field, said state field, said zip code field and said country field.

37. The method of claim 36 further comprising weighting said fourth set of constants less than said first set of constants.

38. The method of claim 1 further comprising parsing each of the search elements of said search criteria.

39. The method of claim 38, further comprising for each of the search elements of said search criteria, receiving a first string of characters including at least one of a plurality of letters, numbers, spaces, punctuation marks, and other characters; and producing an output including a sequence of a plurality of second strings having at least one of a plurality of letters and a plurality of numbers.

40. The method of claim 39 further comprising receiving said search criteria including a name field as one of said search fields including at least one of said search elements;

searching for contiguous sets of at least one numeric value in said name field; and replacing each of said contiguous sets with a space character.

41. The method of claim 39 further comprising receiving said search criteria including at least one of a company field, an address field and a city field as said search fields including at least one of said search elements;

searching for contiguous sets of non-letter, non-numeric values in each of the search elements of said company field, said address field and said city field; and replacing each of said contiguous sets with a space character.

42. The method of claim 39 further comprising employing a prefix table including a plurality of prefixes;

comparing each of the second strings of the output with each of the prefixes of the prefix table to provide at least one prefix match; and for each of said at least one prefix match, providing a new output comprising a corresponding one of said at least one prefix match, a space character, and a corresponding one of said second strings excluding the corresponding one of said at least one prefix match.

43. The method of claim 38 further comprising employing at least one word for some of the search elements of said search criteria;

employing a suffix table including a plurality of first suffixes and a plurality of corresponding replacement suffixes; and determining if any of said words ends in one of the first suffixes of the suffix table and responsively replacing said one of the first suffixes with the corresponding replacement suffix.

44. The method of claim 43 further comprising employing three characters, IES, as one of said first suffixes; and employing one character, Y, as the corresponding one of said replacement suffixes.

45. The method of claim 43 further comprising employing two characters, ES, as one of said first suffixes; and employing no characters as the corresponding one of said replacement suffixes, thereby deleting said two characters.

46. The method of claim 43 further comprising employing one character, S, as one of said first suffixes; and employing no characters as the corresponding one of said replacement suffixes, thereby deleting said one character.

47. The method of claim 43 further comprising prior to said step of determining if any of said words ends in one of the first suffixes of the suffix table, recursively replacing any two consecutive identical characters in any of said words with one of said identical characters.

48. The method of claim 43 further comprising employing a string reduction table including a plurality of first character strings, a plurality of corresponding conditions and a plurality of corresponding replacement character strings; and recursively searching for one of the first character strings in any of said words, determining if the corresponding condition is met, and responsively replacing said one of the first character strings with the corresponding replacement character string.

49. The method of claim 48 further comprising constructing a search priority array including a plurality of records;

employing with each of the records of said search priority array a plurality of fields including a consonant key field and a vowel key field; and producing said consonant key field and said vowel key field in the search priority array for each of said words.

50. The method of claim 49 further comprising determining if a count of consonants in the consonant key field is greater than three characters in length; and removing the third character from said consonant key field.

51. The method of claim 48 further comprising employing at least some of SION, SCH, SCH, SC, SH, PH, CK, G, J, H, and KN as said first character strings; and employing at least some of TION, SK, S, SK, S, F, K, J, H, no characters, and N as said corresponding replacement character strings, respectively.

52. The method of claim 51 further comprising
always replacing SION, PH and CK, with TION, F and K, respectively.

53. The method of claim 51 further comprising
replacing (i) SCH, (ii) SCH and (iii) SC, with (i) SK, (ii) S and (iii) SK, (i) if a character following H in SCH is a vowel or a Y, (ii) if a character following H in SCH is not a vowel or not a Y and (iii) unless a character following SC is H, respectively.

54. The method of claim 51 further comprising
replacing (i) SH, (ii) G, (iii) J, (iv) H, and (v) KN with (i) S, (ii) J, (iii) H, (iv) no characters, and (v) N if (i) if a character following H in SH is not a vowel or not a Y, (ii) if G is a first character of said first character string and is followed by a vowel or a Y, (iii) if J is not a first character of said first character string, (iv) if H is not a first character of said first character string and is not preceded by a vowel, Y, T, or C, and (v) if KN is the first two characters of said first character string and is followed by a vowel or Y, respectively.

55. The method of claim 48 further comprising
repeating said step of recursively searching if any of said one of the first character strings is responsively replaced.

56. The method of claim 48 further comprising
storing said string reduction table in memory; and
adjusting said string reduction table.

57. A search engine system for searching a database including a plurality of records each of which has a plurality of record fields and a plurality of record elements, said system comprising:
means for receiving a search criteria including a plurality of search elements corresponding to at least some of the record elements of said database, each of said search elements being capable of returning one or more corresponding search results from the records of said database;
means for ordering the search elements of said search criteria based upon an expected size of the corresponding search results from said database; and
means for searching said database with one of said search elements, which is expected to provide a first group of said search results, before searching said database with another one of said search elements, which is expected to provide a second group of said search results, said second group being larger in size than said first group.

58. The system of claim 57 wherein said means for ordering the search elements includes a pre-processing routine; wherein said means for searching said database includes a search engine routine; wherein said database is a predetermined database; and wherein said pre-processing routine associates said predetermined database with said search engine routine.

59. The system of claim 58 wherein said predetermined database is exclusively associated with said search engine routine.

60. The system of claim 58 wherein said predetermined database is a global database; and wherein said pre-processing routine links said global database to said search engine routine.

61. A method of providing a key table for use by a search engine for a database, said database including a plurality of records, each of said records having a plurality of record fields and a plurality of record elements, said method comprising:
parsing the record elements of the record fields of said database and extracting at least one word for each of said record elements;
assigning a field type value to each of said words based upon its origin from a corresponding one of the record fields of said database;
assigning a word position value to each of said words based upon its origin from a particular word position in the corresponding one of the record fields of said database;
constructing said key table including a plurality of records, each of which corresponds to one of said words;
employing a plurality of fields with each of the records of said key table, said fields of the records of said key table comprising a record identifier field, a field type field, a word position field, an original word field, a replacement word field, a consonant key field and a vowel key field;
assigning a unique value to each of the record identifier fields;
for each of said words, assigning the field type value to a corresponding one of the field type fields, assigning the word position value to a corresponding one of the word position fields, and assigning said word to a corresponding one of the original word fields;
employing an array of replacement words including a plurality of records having an original word and a replacement word;
for at least some of said words, determining a corresponding one of the replacement words from said array of replacement words and assigning said corresponding one of the replacement words to a corresponding one of the replacement word fields; and
for each of said words, determining a corresponding consonant key value and a corresponding vowel key value, assigning the consonant key value to a corresponding one of the consonant key fields, and assigning the vowel key value to a corresponding one of the vowel key fields.

62. The method of claim 61 further comprising
parsing each of said words.

63. The method of claim 62 further comprising
for each of said words, receiving a first string of characters including at least one of a plurality of letters, numbers, spaces, punctuation marks and other characters; and
producing an output including a sequence of a plurality of second strings having at least one of a plurality of letters and a plurality of numbers.

64. The method of claim 63 further comprising
employing a name field as one of the record fields of said database;
for each of said words from said name field, searching for contiguous sets of at least one numeric value in said name field; and
replacing each of said contiguous sets with a space character.

65. The method of claim 63 further comprising
employing a name field and an address field as some of the record fields of said database;
for each of said words from said address field, searching for contiguous sets of non-letter, non-numeric values in said address field; and
replacing each of said contiguous sets with a space character.

66. The method of claim 63 further comprising employing a prefix table including a plurality of prefixes;

comparing each of the second strings of the output with each of the prefixes of the prefix table to provide at least one prefix match; and for each of said at least one prefix match, providing a new output comprising a corresponding one of said at least one prefix match, a space character, and a corresponding one of said second strings excluding the corresponding one of said at least one prefix match.

67. The method of claim 66 further comprising storing said prefix table in a memory before constructing said key table;

updating the prefixes in said prefix table in said memory; and reconstructing said key table.

68. The method of claim 67 further comprising adding a new prefix to the prefixes in said prefix table in said memory.

69. The method of claim 67 further comprising removing a prefix from the prefixes in said prefix table in said memory.

70. The method of claim 62 further comprising employing a plurality of characters in at least some of said words;

sequentially extracting the characters from one of said at least some of said words; and discarding any one of said characters which matches a previous one of said characters.

71. The method of claim 70 further comprising for each of said words, determining whether any non-discarded one of said characters is a vowel and responsively appending said vowel to a corresponding one of the vowel key fields, and determining whether any non-discarded one of said characters is a consonant and responsively appending said consonant to a corresponding one of the consonant key fields.

72. The method of claim 71 further comprising for each of the consonant key fields, determining if a count of consonants in the consonant key field is greater than three and responsively removing a third one of said consonants from said consonant key field.

73. The method of claim 62 further comprising employing at least one word for some of the search elements of said search criteria;

employing a suffix table including a plurality of first suffixes and a plurality of corresponding replacement suffixes; and determining if any of said words ends in one of the first suffixes of the suffix table and responsively replacing said one of the first suffixes with the corresponding replacement suffix.

74. The method of claim 73 further comprising employing three characters, IES, as one of said first suffixes; and employing one character, Y, as the corresponding one of said replacement suffixes.

75. The method of claim 73 further comprising employing two characters, ES, as one of said first suffixes; and employing no characters as the corresponding one of said replacement suffixes, thereby deleting said two characters.

76. The method of claim 73 further comprising employing one character, S, as one of said first suffixes; and employing no characters as the corresponding one of said replacement suffixes, thereby deleting said one character.

77. The method of claim 73 further comprising prior to said step of determining if any of said words ends in one of the first suffixes of the suffix table, recursively replacing any two consecutive identical characters in any of said words with one of said identical characters.

78. The method of claim 73 further comprising employing a pseudo-phonetic string reduction table including a plurality of first character strings, a plurality of corresponding conditions and a plurality of corresponding replacement character strings; and recursively searching for one of the first character strings in any of said words, determining if the corresponding condition is met and responsively replacing said one of the first character strings with the corresponding replacement character string.

79. The method of claim 78 further comprising determining if a count of consonants in the consonant key field is greater than three characters in length; and removing the third character from said consonant key field.

80. The method of claim 78 further comprising employing at least some of SION, SCH, SCH, SC, SH, PH, CK, G, J, H, and KN as said first character strings; and employing at least some of TION, SK, S, SK, S, F, K, J, H, no characters, and N as said corresponding replacement character strings, respectively.

81. The method of claim 80 further comprising always replacing SION, PH and CK, with TION, F and K, respectively.

82. The method of claim 78 further comprising replacing (i) SCH, (ii) SCH and (iii) SC, with (i) SK, (ii) S and (iii) SK, (i) if a character following H in SCH is a vowel or a Y, (ii) if a character following H in SCH is not a vowel or not a Y and (iii) unless a character following SC is H, respectively.

83. The method of claim 78 further comprising replacing (i) SH, (ii) G, (iii) J, (iv) H, and (v) KN with (i) S, (ii) J, (iii) H, (iv) no characters, and (v) N if (i) if a character following H in SH is not a vowel or not a Y, (ii) if G is a first character of said first character string and is followed by a vowel or a Y, (iii) if J is not a first character of said first character string, (iv) if H is not a first character of said first character string and is not preceded by a vowel, Y, T, or C, and (v) if KN is the first two characters of said first character string and is followed by a vowel or Y, respectively.

84. The method of claim 78 further comprising repeating said step of recursively searching if any of said one of the first character strings is responsively replaced.

85. The method of claim 78 further comprising storing said pseudo-phonetic string reduction table in memory; and adjusting said pseudo-phonetic string reduction table in said memory.

86. The method of claim 61 further comprising storing said array of replacement words in a memory before constructing said key table;

updating one of the original words or one of the replacement words in said array of replacement words in said memory; and reconstructing said key table after said step of updating one of the original words or one of the replacement words.

87. The method of claim 86 further comprising adding another one of the original words and another corresponding one of the replacement words to said memory.

88. The method of claim 86 further comprising removing one of the original words and a corresponding one of the replacement words from said memory.

89. The method of claim 86 further comprising editing one of the original words or a corresponding one of the replacement words in said memory.

* * * * *

UNITED STATES PATENT AND TRADEMARK OFFICE
CERTIFICATE OF CORRECTION

PATENT NO. : 6,691,103 B1
DATED : April 2, 2002
INVENTOR(S) : Keith A. Wozny

Page 1 of 1

It is certified that error appears in the above-identified patent and that said Letters Patent is hereby corrected as shown below:

Column 3,
Line 38, delete the "." after "results,".

Column 6,
Lines 13, 14 and 18, "Word" should read -- *Word* --.

Column 9,
Line 23, ""Words"" should read -- "*Words*" --.
Line 23, "Word" should read -- *Word* --.
Line 33, ""don't"" should read -- "don""""t" --.
Lines 37 and 49, "Words" should read -- *Words* --.

Column 16,
Line 32, remove the ":" after the first instance of "the".

Column 17,
Lines 18, 23, 49 and 52, "Word" should read -- *Word* --.

Signed and Sealed this

Twenty-second Day of June, 2004

JON W. DUDAS
*Acting Director of the United States Patent and Trademark Office*